(12) United States Patent
Nakao et al.

(10) Patent No.: US 8,837,402 B2
(45) Date of Patent: Sep. 16, 2014

(54) TERMINAL DEVICE AND SIGNAL TRANSMISSION CONTROL METHOD

(75) Inventors: Seigo Nakao, Kanagawa (JP); Akihiko Nishio, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 333 days.

(21) Appl. No.: 13/390,202

(22) PCT Filed: Aug. 16, 2010

(86) PCT No.: PCT/JP2010/005071
§ 371 (c)(1),
(2), (4) Date: Feb. 13, 2012

(87) PCT Pub. No.: WO2011/021380
PCT Pub. Date: Feb. 24, 2011

(65) Prior Publication Data
US 2012/0140728 A1    Jun. 7, 2012

(30) Foreign Application Priority Data

Aug. 17, 2009  (JP) ................................ 2009-188760
Feb. 9, 2010   (JP) ................................ 2010-026943

(51) Int. Cl.
| | |
|---|---|
| H04W 4/00 | (2009.01) |
| H04L 12/26 | (2006.01) |
| H04L 1/16 | (2006.01) |
| H04L 5/00 | (2006.01) |
| H04L 1/18 | (2006.01) |
| H04W 28/06 | (2009.01) |
| H04W 72/12 | (2009.01) |
| H04W 72/04 | (2009.01) |
| H04W 28/04 | (2009.01) |

(52) U.S. Cl.
CPC ............ H04L 1/1829 (2013.01); H04L 1/1692 (2013.01); H04L 5/003 (2013.01); *H04W 28/06* (2013.01); H04L 5/0053 (2013.01); *H04W 72/1284* (2013.01); *H04W 72/04* (2013.01); H04L 5/0023 (2013.01); *H04W 28/04* (2013.01); H04L 5/0055 (2013.01)
USPC ............................ 370/329; 370/328; 370/252

(58) Field of Classification Search
CPC ...................................................... H04W 28/04
USPC ........................................ 370/328, 329, 352
See application file for complete search history.

(56) References Cited

U.S. PATENT DOCUMENTS

| | | | |
|---|---|---|---|
| 6,717,916 B1 * | 4/2004 | Ahn et al. ..................... | 370/252 |
| 2009/0109917 A1 * | 4/2009 | Pajukoski et al. ............. | 370/329 |
| 2009/0274100 A1 * | 11/2009 | Montojo et al. .............. | 370/328 |

OTHER PUBLICATIONS

3GPP TS 36.211 V8.7.0, "Physical Channels and Modulation" Release 8), May 2009.

(Continued)

*Primary Examiner* — Kiet Tang
(74) *Attorney, Agent, or Firm* — Pearne & Gordon LLP

(57) ABSTRACT

Disclosed is a terminal device in which increase in the overhead of an uplink control channel can be suppressed even when SCTD is applied to the transmission of response signals and SRs. Either a response signal or SR is allocated to mutually different encoding resources, and a terminal (200) transmits from each of a plurality of antennas. A control section (208) transmits a response signal or SR using an SR resource or ACK/NACK resource, which are mutually different encoding resources, and a shared resource. The control section (208) uses the encoding resource, which is either the SR resource to which a response signal is allocated when a response signal and SR are generated concurrently, and to which an SR is allocated when only an SR is generated, or the ACK/NACK resource to which a response signal is allocated when only a response signal is generated. The control section (208) also uses the shared resource to which a response signal is allocated when a response signal and SR are generated concurrently and when only a response signal is generated, and to which an SR is allocated when only an SR is generated.

7 Claims, 17 Drawing Sheets

(56) References Cited

OTHER PUBLICATIONS

3GPP TS 36.212 V8.7.0, "Multiplexing and channel coding" Release 8), May 2009.
3GPP TS 36.212 V8.7.0, "Physical layer procedures" Release 8), May 2009.
Seigo Nakao, et al., "Performance enhancement of E-UTRA uplink control channel in fast fading environments", Proceeding of IEEE VTC 2009, spring, Apr. 2009.
Nakao, et al., "Considerations on the necessity of Tx diversity schemes for LTE-Advanced uplink control channels", IEICE techincal report RCS2009-63, Jul. 2009.
3GPP TSG RAN WG1 Meeting #57bis, Los Angeles, USA, Jun. 29-Jul. 3, 2009, "LTE-A transmit diversity schemes for PUCCH format 1/1a/1b" R1-092340.
3GPP TSG RAN WG1 Meeting #57bis, Los Angeles, USA, Jun. 29-Jul. 3, 2009, "PUCCH TxD Schemes for LTE-A" R1-092509.
3GPP TSG RAN WG1 Meeting #57bis,San Francisco, USA, May 4-9, 2009, "Upline Control Channel Design for LTE-Advanced" R1-091702.
International Search Report for PCT/JP2010/005071 dated Nov. 9, 2010.

* cited by examiner

TERMINAL DEVICE AND SIGNAL TRANSMISSION CONTROL METHOD

TECHNICAL FIELD

The present invention relates to a terminal apparatus and a signal transmission control method.

BACKGROUND ART

3GPP LTE adopts OFDMA (Orthogonal Frequency Division Multiple Access) as a downlink communication scheme. In a radio communication system to which 3GPP LTE is applied, a base station transmits a synchronization signal (Synchronization Channel: SCH) and broadcast signal (Broadcast Channel: BCH) using predetermined communication resources. A terminal secures synchronization with the base station by catching an SCH first. After that, the terminal acquires parameters specific to the base station (e.g. frequency bandwidth) by reading BCH information (see Non-Patent Literatures 1, 2 and 3).

Furthermore, after completing the acquisition of parameters specific to the base station, the terminal makes a connection request to the base station to thereby establish communication with the base station. The base station transmits control information to the terminal with which communication is established via a PDCCH (Physical Downlink Control CHannel) as required.

The terminal then makes a "blind decision" on each of a plurality of pieces of control information included in the received PDCCH signal. That is, the control information includes a CRC (Cyclic Redundancy Check) portion and this CRC portion is masked with a terminal ID of the transmission target terminal in the base station. Therefore, the terminal cannot decide whether or not the control information is directed to the terminal until the CRC portion of the received control information is demasked with the terminal ID of the terminal. When the demasking result shows that the CRC calculation is OK in the blind decision, the control information is decided to be directed to the terminal.

Furthermore, in 3GPP LTE, ARQ (Automatic Repeat Request) is applied to downlink data from a base station to a terminal. That is, the terminal feeds back a response signal indicating the error detection result of the downlink data to the base station. The terminal performs a CRC on the downlink data and feeds back ACK (Acknowledgment) when CRC=OK (no error) and NACK (Negative Acknowledgment) when CRC=NG (error present) as a response signal to the base station. A binary phase shift keying (BPSK) scheme is used for modulation of the response signal (that is, the ACK/NACK signal). Further, an uplink control channel such as a physical uplink control channel (PUCCH) is used for feedback of the response signal. When the received response signal represents NACK, the base station transmits retransmission data to the terminal.

Here, the control information (that is, downlink assignment control information) transmitted from the base station includes resource assignment information including resource information assigned from the base station to the terminal and the like. The aforementioned PDCCH is used for transmission of this control information. This PDCCH is made up of one or a plurality of L1/L2 CCHs (L1/L2 Control Channels). Each L1/L2 CCH is made up of one or a plurality of CCEs (Control Channel Elements). That is, a CCE is a base unit when control information is mapped to a PDCCH. Furthermore, when one L1/L2 CCH is made up of a plurality of CCEs, a plurality of continuous CCEs are assigned to the L1/L2 CCH. The base station assigns an L1/L2 CCH to the resource assignment target terminal according to the number of CCEs necessary to notify control information for the resource assignment target terminal. The base station then transmits control information mapped to physical resources corresponding to the CCEs of the L1/L2 CCH.

Here, each CCE has a one-to-one correspondence with a component resource of the PUCCH. Thus, the terminal that has received the L1/L2 CCH can implicitly specify component resources of the PUCCH corresponding to the CCEs configuring the L1/L2 CCH, and transmits the response signal to the base station using the specified resources. Accordingly, downlink communication resources can be efficiently used.

As shown in FIG. 1, a plurality of response signals transmitted from a plurality of terminals are spread by a ZAC (Zero Auto-correlation) sequence having a Zero Auto-correlation characteristic, Walsh sequence and DFT (Discrete Fourier Transform) sequence on the time axis, and code-multiplexed within the PUCCH. In FIG. 1, ($W_0$, $W_1$, $W_2$, $W_3$) represents a Walsh sequence having a sequence length of 4 and ($F_0$, $F_1$, $F_2$) represents a DFT sequence having a sequence length of 3. As illustrated in FIG. 1, in the terminal, a response signal of ACK or NACK is primary-spread in a one single carrier frequency division multiple access (1 SC-FDMA) symbol on a frequency axis by a ZAC sequence (having a sequence length of 12). Next, the primary-spread response signal is subjected to inverse fast Fourier transform (IFFT) in association with $W_0$ to $W_3$ and $F_0$ to $F_2$. The response signal spread by the ZAC sequence having the sequence length of 12 on the frequency axis is transformed into a ZAC sequence having a sequence length of 12 on the time axis through the IFFT. The signal which has been subjected to the IFFT is secondary-spread using Walsh sequences (having a sequence length of 4) and DFT sequences (having a sequence length of 3).

Here, response signals transmitted from different terminals are spread using sequences corresponding to different cyclic shift indices or different orthogonal cover (OC) indices (that is, a set of a Walsh sequence and a DFT sequence). Therefore, the base station can demultiplex a plurality of code-multiplexed response signals using a conventional despreading process and a conventional correlation process (see Non-Patent Literature 4).

Further, the standardization of 3GPP LTE-advanced that realizes faster communication than 3GPP LTE has started. A 3GPP LTE-advanced system (which may also be hereinafter referred to as "LTE-A system") follows the 3GPP LTE system (which may also be hereinafter referred to as "LTE system"). In order to realize a downlink transmission rate of a maximum of 1 Gbps or above, 3GPP LTE-advanced is expected to introduce base stations and terminals capable of communicating at a wideband frequency of 40 MHz or above.

In an LTE-A system, to simultaneously realize communication at an ultra-high transmission rate several times as fast as a transmission rate in an LTE system and backward compatibility with the LTE system, a band for the LTE-A system is divided into "unit bands" of 20 MHz or less, which is a supported bandwidth for the LTE system. That is, the "unit band" is a band having a width of maximum 20 MHz and defined as a base unit of a communication band. Furthermore, a "unit band" in a downlink (hereinafter, referred to as "downlink unit band") may be defined as a band divided by downlink frequency band information included in the BCH broadcasted from the base station, or a band by a spreading width when the downlink control channel (PDCCH) is spread and arranged in the frequency domain. Further, a "unit band" in an uplink (hereinafter, referred to as "uplink unit band") may be defined as a band divided by uplink frequency band information included in the BCH broadcasted from the base station, or as a base unit of a communication band of 20 MHz or less, which includes a physical uplink shared channel (PUCCH) region near the center thereof and PUCCHs for the LTE at both ends thereof. Furthermore, in 3GPP LTE-Advanced, the "unit band" may also be expressed as "component carrier(s)" in English.

Meanwhile, the uplink control channel (PUCCH) is also used for transmission of a scheduling request (SR) (which may be represented by a scheduling request indicator (SRI)) which is an uplink control signal indicating that uplink data to be transmitted from the terminal side has been generated. When a connection with the terminal has been established, the base station individually assigns a resource to be used for transmission of the SR (hereinafter, referred to as "SR resource) to each terminal. Further, an on-off keying (OOK) scheme is applied to the SR, and the base station detects the SR from the terminal based on whether or not the terminal is transmitting an arbitrary signal using the SR resource. Further, the SR is spread using the ZAC sequence, the Walsh sequence, and the DFT sequence, in the same manner as the above mentioned response signal.

In the LTE system, the SR and the response signal may be generated in the same sub frame. In this case, when the terminal code-multiplexes and transmits the SR and the response signal, a peak to average power ratio (PAPR) of a synthesized waveform of a signal transmitted from the terminal significantly deteriorates. However, in the LTE system, since importance is put on amplification efficiency of the terminal, when the SR and the response signal have been generated in the same sub frame at the terminal side, the terminal transmits the response signal using the SR resource previously individually assigned to each terminal, without using a resource (hereinafter, referred to as "ACK/NACK resource") used for transmission of the response signal. Thus, the PAPR of the synthesized waveform of the signal transmitted from the terminal can be reduced. At this time, the base station detects the SR from the terminal based on whether or not the SR resource is being used. In addition, the base station determines whether or not the terminal has transmitted either ACK or NACK, based on a phase (that is, a BPSK demodulation result) of a signal transmitted through the SR resource (the ACK/NACK resource when the SR resource is not used).

Further, in the LTE-A system, the terminal is assumed to include a plurality of transmitting antennas, and it is being discussed to apply space code transmit diversity (SCTD) (which is also called spatial orthogonal-resource transmit diversity (SORTD)) using a plurality of different code resources for the SR or the response signal. In the SCTD, for example, the base station assigns two ACK/NACK resources to one response signal, and the terminal transmits the same response signal assigned to each of different code resources through two antennas (see Non-Patent Literature 5).

CITATION LIST

Non-Patent Literature

NPL 1
3GPP TS 36.211 V8.7.0, "Physical Channels and Modulation (Release 8)," 2009-05
NPL 2
3GPP TS 36.212 V8.7.0, "Multiplexing and channel coding (Release 8)," 2009-05

NPL 3
3GPP TS 36.213 V8.7.0, "Physical layer procedures (Release 8)," 2009-05
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5 S. Nakao, T. Yoshida, M. Fukuoka, D. Imamura, "Considerations on the necessity of Tx diversity schemes for LTE-Advanced uplink control channels," IEICE technical report RCS2009-63, July, 2009

SUMMARY OF INVENTION

Technical Problem

As described above, the SR resource and the ACK/NACK resource have the same format, and when the SR and the response signal are simultaneously transmitted, the terminal transmits the response signal using the SR resource. Here, when the SCTD is applied to transmission of the SR and the response signal, it is necessary to prepare a plurality of ACK/NACK resources and a plurality of SR resources, and so that the overhead of the uplink control channel (PUCCH) increases.

For example, a description will be made in connection with an example in which each of the ACK/NACK resource and the SR resource is assigned to two different code resources as illustrated in FIG. 2. In the downlink unit band illustrated in FIG. 2, the base station transmits downlink assignment control information representing a resource for transmitting downlink data using an L1/L2 CCH included in the PDCCH (a channel configured with one or more CCEs). Further, the base station assigns two arbitrary PUCCH resources included in the PUCCH of the uplink unit band in advance as a PUCCH resource (SR resource) for SR as illustrated in FIG. 2. Further, the terminal uses two PUCCH resources respectively associated with the CCEs (PDCCH) occupied by the downlink assignment control information in the downlink unit band as a PUCCH resource (ACK/NACK resource) for the response signal. Here, it is assumed that the terminal includes two antennas.

First, when the terminal simultaneously transmits the SR and the response signal as illustrated in FIG. 3A, the terminal assigns a response signal ("A/N") to downlink data (DL data) received through a downlink data channel (PDSCH) illustrated in FIG. 2 to two SR resources included in the PUCCH of the uplink unit band illustrated in FIGS. 3A to 3C. Then, the terminal transmits the response signal ("A/N") assigned to the two SR resources through the two antennas respectively.

Next, when the terminal transmits only the response signal in a certain sub frame as illustrated in FIG. 3B, the terminal assigns a response signal ("A/N") with respect to DL data received through the PDSCH illustrated in FIG. 2, to two ACK/NACK resources included in the PUCCH of the uplink unit band illustrated in FIG. 3. Then, the terminal transmits the response signal ("A/N") assigned to the two ACK/NACK resources through the two antennas respectively.

Next, when the terminal transmits only the SR signal in a certain sub frame as illustrated in FIG. 3C, the terminal assigns a SR to two SR resources included in the PUCCH of the uplink unit band illustrated in FIG. 3. Then, the terminal transmits the SR assigned to the two SR resources through the two antennas respectively.

As illustrated in FIGS. 3A to 3C, when the SCTD is applied to transmission of the SR and the response signal, it is necessary to prepare the two SR resources and the two ACK/NACK resources respectively. Further, as illustrated in FIGS. 3A to 3C, in both cases, when the SCTD is applied to the SR and the response signal, the terminal transmits the SR or the response signal using any two code resources among four different code resources of the two SR resources and the two ACK/NACK resources. That is, the terminal does not consistently use the two code resources among the four code resources (the two SR resources and the two ACK/NACK resources).

As described above, when the SCTD is applied to transmission of the SR and the response signal, it is necessary to prepare a plurality of SR resources and a plurality of ACK/NACK resources. In addition, since a half of a plurality of ACK/NACK resources and a plurality of SR resources are not used in the same sub frame, waste of the resources increases. That is, when the SCTD is applied to transmission of the SR and the response signal, the overhead of the uplink control channel (PUCCH) wastefully increases.

It is an object of the present invention to provide a terminal apparatus and a signal transmission control method, which are capable of suppressing an increase in the overhead of the uplink control channel (PUCCH) even when the SCTD is applied to transmission of the SR and the response signal.

Solution to Problem

A terminal apparatus of the present invention is a terminal apparatus that assigns either a response signal based on an error detection result of downlink data or an uplink control signal representing generation of uplink data to different code resources, and transmits the response signal or the uplink control signal assigned to the different code resources through a plurality of antennas, and employs a configuration including a receiving section that receives the downlink data assigned to a downlink data channel, a generating section that generates the response signal based on the error detection result of the downlink data, a transmitting section that transmits the response signal or the uplink control signal using the different code resources, and a control section that controls transmission of the response signal or the uplink control signal based on a generation status of the response signal and the uplink control signal, wherein the control section transmits the uplink control signal or the response signal using either one of a first code resource to which the response signal is assigned when the uplink control signal and the response signal have been simultaneously generated within a transmission unit time and to which the uplink control signal is assigned when only the uplink control signal has been generated within the transmission unit time and a second code resource to which the response signal is assigned when only the response signal has been generated within the transmission unit time, and using a third code resource to which the response signal is assigned when the uplink control signal and the response signal have been simultaneously generated within the transmission unit time and when only the response signal has been generated within the transmission unit time and to which the uplink control signal is assigned when only the uplink control signal has been generated within the transmission unit time, among the first resource, the second resource, and the third resource which are different code resources.

A signal transmission control method of the present invention is a signal transmission control method in a terminal apparatus that assigns either a response signal based on an error detection result of downlink data or an uplink control signal representing generation of uplink data to different code resources, and transmits the response signal or the uplink control signal assigned to the different code resources through a plurality of antennas, and includes a receiving step of receiving the downlink data assigned to a downlink data channel, a generating step of generating the response signal based on the error detection result of the downlink data, a transmitting step of transmitting the response signal or the uplink control signal using the different code resources, and a control step of controlling transmission of the response signal or the uplink control signal based on a generation status of the response signal and the uplink control signal, wherein in the control step, the uplink control signal or the response signal is transmitted using either one of a first code resource to which the response signal is assigned when the uplink control signal and the response signal have been simultaneously generated within a transmission unit time and to which the uplink control signal is assigned when only the uplink control signal has been generated within the transmission unit time and a second code resource to which the response signal is assigned when only the response signal has been generated within the transmission unit time, and using a third code resource to which the response signal is assigned when the uplink control signal and the response signal have been simultaneously generated within the transmission unit time and when only the response signal has been generated within the transmission unit time and to which the uplink control signal is assigned when only the uplink control signal has been generated within the transmission unit time, among the first resource, the second resource, and the third resource which are different code resources.

Advantageous Effects of Invention

According to the present invention, it is possible to suppress an increase in the overhead of the uplink control channel (PUCCH) even when the SCTD is applied to transmission of the SR and the response signal.

DESCRIPTION OF EMBODIMENTS

Figure 1:
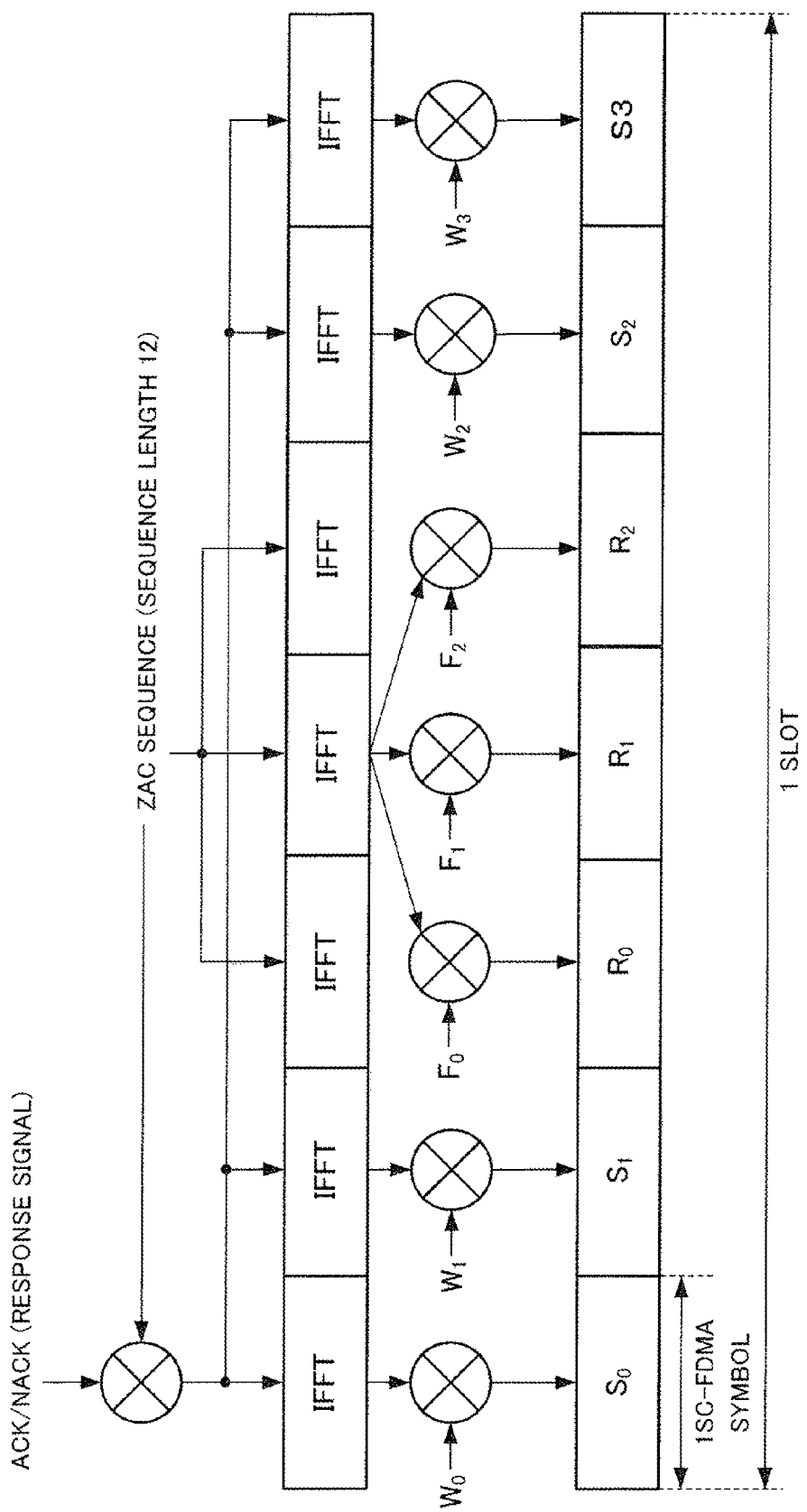
FIG. 1 is a diagram illustrating a method of spreading a response signal and reference signal.

Hereinafter, embodiments of the present invention will be described in detail with reference to the accompanying drawings. In embodiments, like reference numerals denote like parts, and the redundant description will not be repeated.

Embodiment 1

Configuration of Base Station

Figure 4:
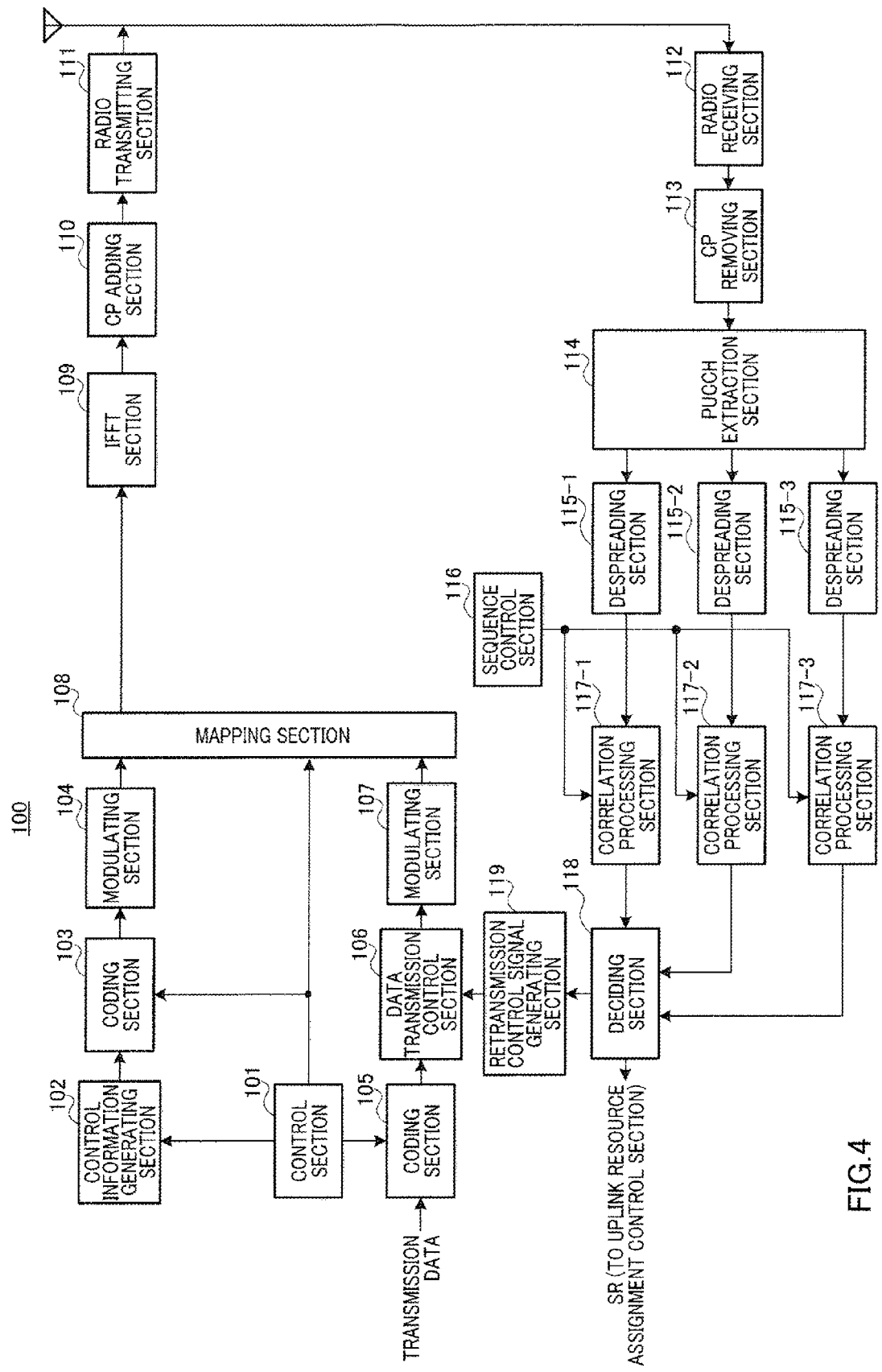
FIG. 4 is a block diagram illustrating a configuration of a base station according to Embodiment 1 of the present invention.

FIG. 4 is a block diagram illustrating a configuration of base station 100 according to the present embodiment. Referring to FIG. 4, base station 100 includes control section 101, control information generating section 102, coding section 103, modulating section 104, coding section 105, data transmission control section 106, modulating section 107, mapping section 108, IFFT section 109, CP adding section 110, radio transmitting section 111, radio receiving section 112, CP removing section 113, PUCCH extracting section 114, despreading section 115, sequence control section 116, correlation processing section 117, deciding section 118, and retransmission control signal generating section 119.

Control section 101 assigns a downlink resource for transmitting control information (that is, downlink control information assignment resource) and a downlink resource, which is included in the control information, for transmitting downlink data (that is, downlink data assignment resource) to resource assignment target terminal 200 which will be described later. The downlink control information assignment resource is selected from among resources corresponding to the downlink control channel (PDCCH) in the downlink unit band. Further, the downlink data assignment resource is selected from among resources corresponding to the downlink data channel (PDSCH) in the downlink unit band. Further, when a plurality of resource assignment target terminals 200 are present, control section 101 assign different resources to resource assignment target terminals 200, respectively.

The downlink control information assignment resources are equivalent to above-described L1/L2 CCHs. That is, each of the downlink control information assignment resources is made up of one or a plurality of CCEs. Further, the CCEs included in the downlink control information assignment resource are associated with component resources of the uplink control channel (PUCCH) in a one-to-one correspondence manner. An association between the CCE and the PUCCH component resource is made based on an association between the downlink unit band and the uplink unit band broadcasted for the LTE system.

Furthermore, control section 101 determines a coding rate used to transmit control information to resource assignment target terminal 200. Since the amount of data of the control information differs according to this coding rate, control section 101 assigns downlink control information assignment resources having a number of CCEs to which control information corresponding to this amount of data is mapped.

Control section 101 outputs information related to the downlink data assignment resource to control information generating section 102. Further, control section 101 outputs coding rate information used when the control information is transmitted to coding section 103. Further, control section 101 decides a coding rate of transmission data (that is, downlink data) and outputs the decided coding rate to coding section 105. Further, control section 101 outputs information related to the downlink data assignment resource and information related to the downlink control information assignment resource to mapping section 108.

Control information generating section 102 generates control information including the downlink data assignment resource and outputs the generated control information to coding section 103. When a plurality of resource assignment target terminals 200 are present, a terminal ID of a destination terminal is included in the control information so as to discriminates between resource assignment target terminals 200. For example, the control information includes a CRC bit masked with a terminal ID of the destination terminal. This control information may be called "downlink assignment control information."

Coding section 103 encodes the control information input from control information generating section 102 according to the coding rate received from control section 101, and outputs the encoded control information to modulating section 104.

Modulation section 104 modulates the coded control information and outputs the modulated signal obtained to mapping section 108.

Coding section 105 receives transmission data (that is, downlink data) as an input for each transmission destination terminal 200 and the coding rate information from control section 101, encodes the transmission data at the coding rate represented by the coding rate information, and outputs the encoded transmission data to data transmission control section 106.

At the time of first time transmission, data transmission control section 106 retains the encoded transmission data and also transmits the encoded transmission data to modulating section 107. The encoded transmission data is retained for each transmission destination terminal 200. Further, when a retransmission control signal received from retransmission control signal generating section 119 represents a retransmission command, data transmission control section 106 outputs retention data corresponding to the retransmission control signal to modulating section 107. Further, when the retransmission control signal received from retransmission control signal 119 represents that retransmission is not required, data transmission control section 106 erases retention data corresponding to the retransmission control signal. In this case, data transmission control section 106 outputs next first-time transmission data to modulating section 107.

Modulating section 107 modulates the encoded transmission data received from data transmission control section 106, and outputs a modulated signal to mapping section 108.

Mapping section 108 maps the modulated signal of the control information (the downlink assignment control information) received from modulating section 104 to a resource (a resource in the PDCCH) represented by the downlink control information assignment resource received from control section 101, and outputs the mapping result to IFFT section 109.

Further, mapping section 108 maps the modulated signal (the downlink data) of the transmission data received from modulating section 107 to a resource (a resource in the PDSCH) represented by the downlink data assignment resource received from control section 101, and outputs the mapping result to IFFT section 109.

The control information and the transmission data (the downlink data) mapped to a plurality of sub carriers in the downlink unit band by mapping section 108 are transformed from frequency-domain signals into time-domain signals by IFFT section 109, are transformed into OFDM signals with a CP added by CP adding section 110, are subjected to a transmission process such as a digital to analog (D/A) conversion process, an amplification process, and an up-conversion process by radio transmitting section 111, and are transmitted to terminal 200 via an antenna.

Radio receiving section 112 receives an uplink control channel signal (a PUCCH signal) transmitted from terminal 200 via the antenna, and performs a reception process such as a down-conversion process and an analog to digital (A/D) conversion process, on the received signal. The response signal, the SR signal, or the reference signal may be possibly included in the PUCCH signal.

CP removing section 113 removes a CP added to the received signal which has been subjected to the reception process.

PUCCH extraction section 114 extracts an SR resource, an ACK/NACK resource, and a resource (hereinafter, referred to as "common resource") commonly used at the time of transmission of the SR and at the time of transmission of the response signal from the PUCCH signal included in the received signal, and sorts PUCCH signals corresponding to the extracted resources into processing systems corresponding to the respective resources. Further, terminal 200 transmits uplink control information (that is, either the response signal or the SR, or both of the response signal and the SR) using the two resources of the ACK/NACK resource and the common resource or the two resources of the SR resource and the common resource among three different types of code resources of the SR resource, the ACK/NACK resource, and the common resource.

Base station 100 is provided with processing systems of despreading section 115 and correlation processing section 117 that perform processing with respect to each of the extracted resources. Specifically, despreading section 115-1 and correlation processing section 117-1 are associated with the SR resource, despreading section 115-2 and correlation processing section 117-2 are associated with the ACK/NACK resource, and despreading section 115-3 and correlation processing section 117-3 are associated with the common resource.

Specifically, despreading section 115 despreads a signal received through the SR resource, the ACK/NACK resource, or the common resource from terminal 200 using a Walsh sequence (a code used for secondary spreading of a data portion) and a DFT sequence (a code used for spreading of a reference signal portion) each of which corresponds to the SR resource, the ACK/NACK resource, or the common resource, and outputs the despread signal to correlation processing section 117.

Sequence control section 116 generates ZAC sequences which correspond to the data portion and the reference signal portion of the SR resource, the ACK/NACK resource, or the common resource, which are transmitted from terminal 200. Sequence control section 116 specifies a correlation window for extracting a signal in association with these resources. Sequence control section 116 outputs information representing the specified correlation window and the generated ZAC sequences to correlation processing section 117.

Correlation processing section 117 calculates a correlation value between the despread signal and the ZAC sequence, for each of the data portion (that is, $S_0$ to $S_3$ illustrated in FIG. 1) and the reference signal portion (that is, $R_0$ to $R_2$ illustrated in FIG. 1), using the information representing the correlation window and the ZAC sequences input from sequence control section 116. Then, correlation processing section 117 outputs information related to the calculated correlation value to deciding section 118.

Deciding section 118 decides whether or not the SR and the response signal are being transmitted from the terminal, based on the correlation value input from correlation processing section 117. That is, deciding section 118 decides which one of a set of the SR resource and the common resource and a set of the ACK/NACK resource and the common resource is being used by terminal 200.

For example, when it is decided that the set of the SR resource and the common resource is being used by terminal 200 at timing when the terminal transmits the response signal to the downlink data, deciding section 118 decides that both the SR and the response signal are being transmitted from terminal 200. Further, when it is decided that the set of the SR resource and the common resource is being used by terminal 200 at timing other than timing when the terminal transmits the response signal to the downlink data, deciding section 118 decides that only the SR is being transmitted from terminal 200. Further, when it is decided that the set of the ACK/NACK resource and the common resource is being used by terminal 200, deciding section 118 decides that only the response signal is being transmitted from terminal 200. Further, when it is decided that none of the resources is being used by the terminal, deciding section 118 decides that neither the SR nor the response signal is being transmitted from terminal 200.

In addition, when it is decided that terminal 200 is transmitting the SR, deciding section 118 outputs information related to the SR to an uplink resource assignment control section (not illustrated). Further, when it is decided that terminal 200 is transmitting the response signal, deciding section 118 further decides which of ACK and NACK the response signal represents through synchronization detection. Then, deciding section 118 outputs a decision result (ACK or NACK) for each terminal to retransmission control signal generating section 119. However, when it is decided that terminal 200 is not transmitting the response signal, deciding section 118 outputs discontinuous transmission (DTX) information to retransmission control signal generating section 119.

Further, when the uplink resource assignment control section (not illustrated) receives the SR, base station 100 transmits the uplink assignment control information notifying terminal 200 of an uplink data assignment resource so that terminal 200 can transmit uplink data. As described above, base station 100 decides whether or not a resource for uplink data needs to be assigned to terminal 200, based on the uplink control channel. The details of an operation of the uplink resource assignment control section and the details of an operation of base station 100 as to assigning a resource for uplink data to terminal 200 are omitted.

Retransmission control signal generating section 119 decides whether or not data transmitted in the downlink unit band (downlink data) needs to be retransmitted based on the decision result on the response signal (ACK or NACK) or the DTX information, both of which input from deciding section 118, and generates a retransmission control signal based on a decision result. Specifically, when the response signal representing NACK or the DTX is received, retransmission control signal generating section 119 generates a retransmission control signal representing a retransmission command, and outputs the retransmission control signal to data transmission control section 106. Further, when the response signal representing ACK is received, retransmission control signal generating section 119 generates a retransmission control signal representing that retransmission is not necessary, and outputs the retransmission control signal to data transmission control section 106.

[Configuration of Terminal]

Figure 5:
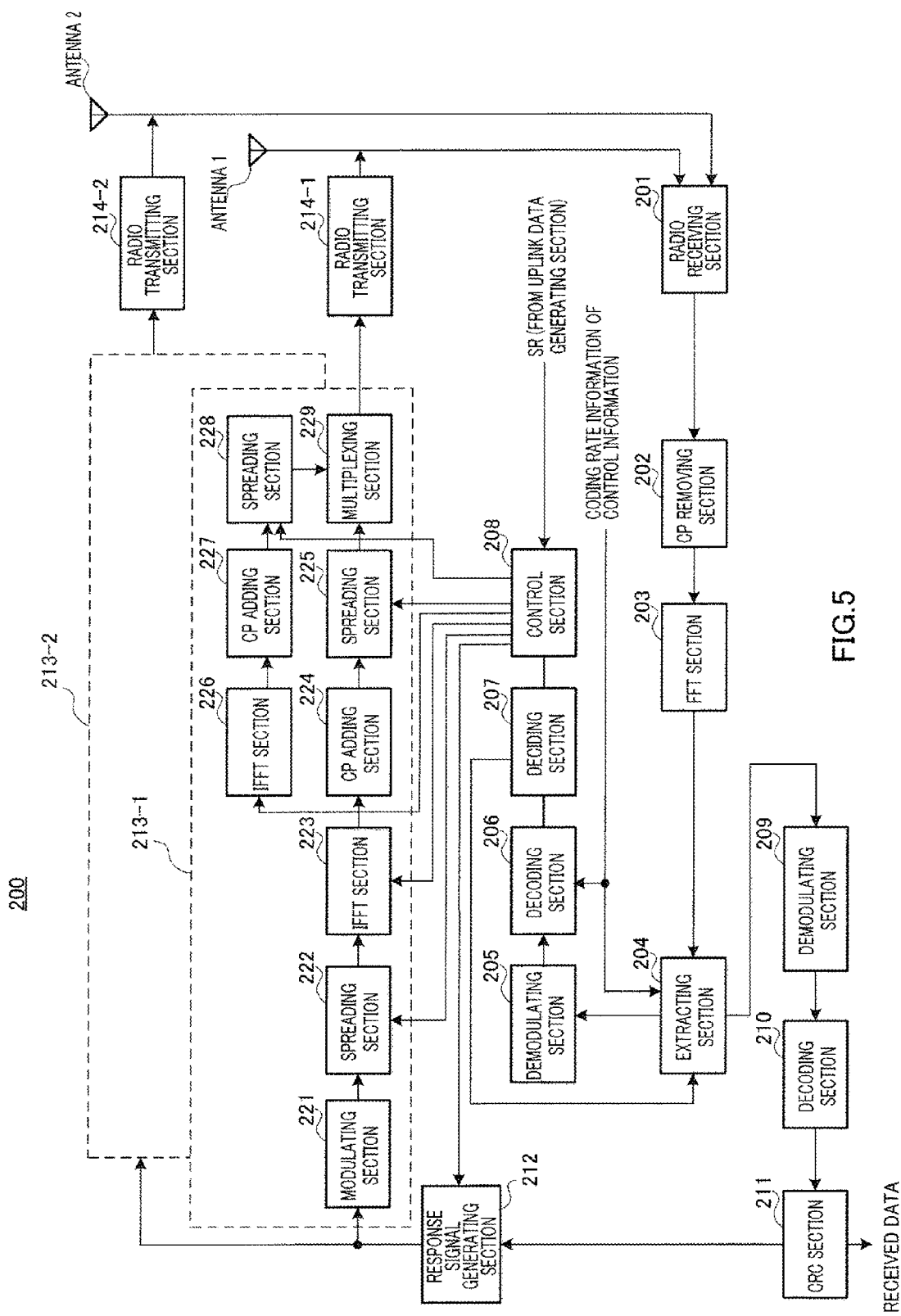
FIG. 5 is a block diagram illustrating a configuration of a terminal according to Embodiment 1 of the present invention.

FIG. 5 is a block diagram illustrating a configuration of terminal 200 according to the present embodiment. Referring to FIG. 5, terminal 200 includes radio receiving section 201, CP removing section 202, fast Fourier transform (FFT) section 203, extracting section 204, demodulating section 205, decoding section 206, deciding section 207, control section 208, demodulating section 209, decoding section 210, CRC section 211, response signal generating section 212, uplink control channel signal generating section 213, and radio transmitting section 214. Further, terminal 200 illustrated in FIG. 5 includes two antennas 1 and 2.

Radio receiving section 201 receives OFDM signals transmitted from base station 100 via antennas 1 and 2, and performs a reception process such as a down-conversion process, an A/D conversion process, on the received OFDM signals. Further, the received OFDM signal includes the PDSCH signal (downlink data) assigned to the resource in the PDSCH or the PDCCH signal (downlink assignment control information) assigned to the resource in the PDCCH.

CP Removing Section 202 Removes a CP Added to the OFDM Signal after the Reception Processing FFT section 203 applies FFT to the received OFDM signal, transforms the OFDM signal into a frequency domain signal and outputs the received signal obtained to extraction section 204.

Further, extracting section 204 extracts the downlink control channel signal (the PDCCH signal) from the received signal that is received from FFT section 203 according to input coding rate information. That is, since the number of CCEs making up downlink control information assignment resources changes according to the coding rate, extraction section 204 extracts a downlink control channel signal using a number of CCEs corresponding to the coding rate as an extraction unit. The extracted downlink control channel signal is outputted to demodulation section 205.

Further, extraction section 204 extracts downlink data (the downlink data channel signal (the PDSCH signal)) from the received signal based on the information related to the downlink data assignment resource, which is addressed to its own terminal, received from deciding section 207, and outputs the extracted downlink data to demodulating section 209.

Demodulating section 205 demodulates the downlink control channel signal received from extracting section 204, and outputs the obtained demodulation result to decoding section 206.

Decoding section 206 decodes the demodulation result received from demodulating section 205 according to the input coding rate information, and outputs the obtained decoding result to deciding section 207.

Deciding section 207 makes a blind decision as to whether or not control information included in the decoding result received from decoding section 206 is control information addressed to its own terminal. This decision is made based on the unit of the decoding result with respect to the above-described extraction unit. For example, deciding section 207 demasks a CRC bit using the terminal ID of its own terminal, and decides control information with CRC=OK (no error) as the control information addressed to the terminal (its own terminal). Then, deciding section 207 outputs information related to the downlink data assignment resource for its own terminal, which is included in the control information addressed to its own terminal, to extracting section 204.

Further, deciding section 207 specifies a CCE mapped to the control information addressed to its own the terminal, and outputs identification information of the specified CCE to control section 208.

Control section 208 specifies a PUCCH resource (frequency/code) corresponding to the CCE represented by the identification information of the CCE received from deciding section 207 as the ACK/NACK resource. Then, control section 208 outputs the ZAC sequence and the cyclic shift index corresponding to each of the specified ACK/NACK resource, and the SR resource and the common resource previously notified from base station 100 to spreading section 222 of uplink control channel signal generating section 213, and outputs frequency resource information to IFFT section 223. Further, control section 208 outputs the ZAC sequence, which functions as the reference signal, and the frequency resource information to IFFT section 226, outputs the Walsh sequence used for secondary spreading of the response signal to spreading section 225, and outputs the DFT sequence used for secondary spreading of the reference signal to spreading section 228.

Specifically, control section 208 outputs the information (the ZAC sequence, the cyclic shift index, the frequency resource information, the Walsh sequence, and the DFT sequence) corresponding to the common resource to uplink control channel signal generating section 213-2. Further, when the SR is received from an uplink data generating section (not illustrated), control section 208 outputs the information (the ZAC sequence, the cyclic shift index, the frequency resource information, the Walsh sequence, and the DFT sequence) corresponding to the SR resource to uplink control channel signal generating section 213-1. Further, when the SR is not received from the uplink data generating section (not illustrated), control section 208 outputs the information (the ZAC sequence, the cyclic shift index, the frequency resource information, the Walsh sequence, and the DFT sequence) corresponding to the ACK/NACK resource to uplink control channel signal generating section 213-1.

Further, when there is no response signal to be transmitted through a sub frame through which the SR has been received (that is, when the downlink assignment control information is not detected at all), control section 208 instructs response signal generating section 212 to output "NACK" to uplink control channel signal generating section 213. That is, control section 208 controls transmission of the response signal or the SR based on generation statuses of the response signal and the SR. The details of transmission control of the SR and the response signal by control section 208 will be described later.

Demodulating section 209 demodulates the downlink data received from extracting section 204, and outputs the demodulated downlink data to decoding section 210.

Decoding section 210 decodes the downlink data received from demodulating section 209, and outputs the decoded downlink data to CRC section 211.

CRC section 211 generates the decoded downlink data received from decoding section 210, and performs error detection using a CRC. CRC section 211 outputs ACK to response signal generating section 212 when CRC=OK (no error), but outputs NACK to response signal generating section 212 when CRC=NG (error). Further, when CRC=OK (no error), CRC section 211 outputs the decoded downlink data as received data.

Response signal generation section 212 generates a response signal to be transmitted from its own terminal to base station 100 based on a reception status of the downlink data (an error detection result of the downlink data), which is input from CRC section 211. Further, when an instruction is given from control section 208 (that is, when terminal 200 transmits only the SR), response signal generating section 212 generates NACK. Then, response signal generating section 212 outputs the generated "response signal or NACK" (hereinafter, abbreviated simply as "response signal") to uplink control channel signal generating sections 213-1 and 213-2.

Uplink control channel signal generating section 213 generates the uplink control channel signal (the PUCCH signal) based on the response signal received from response signal generating section 212. Further, terminal 200 is provided with uplink control channel signal generating sections 213-1 and 213-2 which correspond to antenna 1 and antenna 2 of terminal 200, respectively. Further, uplink control channel signal generating section 213-1 corresponds to the SR resource or the ACK/NACK resource in the PUCCH, and uplink control channel signal generating section 213-2 corresponds to the common resource in the PUCCH.

Specifically, uplink control channel signal generating section 213 includes modulating section 221, spreading section 222, IFFT section 223, CP adding section 224, spreading section 225, IFFT section 226, CP adding section 227, spreading section 228, and multiplexing section 229.

Modulating section 221 modulates the response signal input from response signal generating section 212, and outputs a modulated response signal to spreading section 222.

Spreading section 222 primary-spreads the response signal based on the ZAC sequence and the cyclic shift index set by control section 208, and outputs the primary-spread response signal to IFFT section 223. That is, spreading section 222 primary-spreads the response signal in response to an instruction from control section 208. That is, spreading section 222 multiplies a response signal component represented by a complex number by a component of each ZAC sequence instructed from control section 208.

IFFT section 223 arranges the primary-spread response signal on the frequency axis based on the frequency resource information input from control section 208, and performs IFFT on the primary-spread response signal. Then, IFFT section 223 outputs the response signal which has been subjected to IFFT to CP adding section 224.

CP adding section 224 adds the same signal as the tail part of the response signal which has been subjected to IFFT to the head of the response signal as a CP.

Spreading section 225 secondary-spreads the response signal with the CP using the Walsh sequence set by control section 208, and outputs the secondary-spread response signal to multiplexing section 229. That is, spreading section 225 secondary-spreads the primary-spread response signal using the Walsh sequence corresponding to the resource selected by control section 208. That is, spreading section 225 multiplies the primary-spread response signal by a component of the Walsh sequence.

IFFT section 226 arranges the reference signal on the frequency axis based on the frequency resource information input from control section 208, and performs IFFT on the reference signal. Then, IFFT section 226 outputs the reference signal which has been subjected to IFFT to CP adding section 227.

CP adding section 227 adds the same signal as the tail part of the reference signal which has been subjected to IFFT to the head of the reference signal as a CP.

Spreading section 228 spreads the reference signal with the CP using the DFT sequence instructed from control section 208, and outputs the spread response signal to multiplexing section 229.

Multiplexing section 229 time-multiplexes the secondary-spread response signal and the spread reference signal into one slot, and outputs the slot to radio transmitting section 214 corresponding to antenna 1 and 2 respectively.

Radio transmitting section 214 performs a transmission process, such as a D/A conversion process, an amplification process, and a down-conversion process, on the signal received from multiplexing section 229 of uplink control channel signal generating section 213, and transmits the transmission-processed signal to base station 100 through the antenna. Further, terminal 200 is provided with radio transmitting sections 214-1 and 214-2 which correspond to antenna 1 and antenna 2 of terminal 200, respectively. That is, radio transmitting sections 214-1 transmits the response signal or the SR using the SR resource or the ACK/NACK resource, and radio transmitting sections 214-2 transmits the response signal or the SR using the common resource different from the SR resource (and the ACK/NACK resource).

Figure 6A:
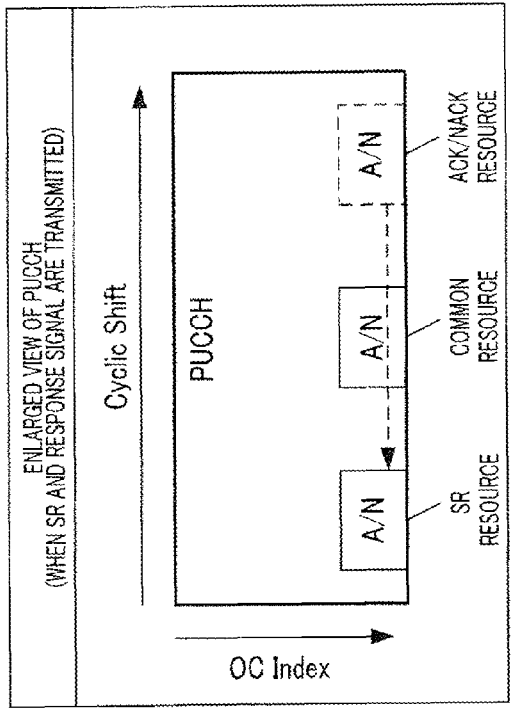
FIGS. 6A and 6D each illustrates an operation of a terminal according to Embodiment 1 of the present invention.

Next, a description will be made in connection with an operation of terminal 200. In the following description, base station 100 notifies terminal 200 of one information related to a resource (the SR resource illustrated in FIG. 6A) for transmitting the SR and one information related to a resource (the common resource illustrated in FIG. 6A) commonly used both at the time of transmission of the SR and at the time of transmission of the response signal in the uplink unit band (the uplink unit band set to terminal 200) in advance as illustrated in FIG. 6A. That is, control section 208 of terminal 200 retains the information related to the SR resource and the information related to the common resource, which are notified from base station 100.

Figure 2:
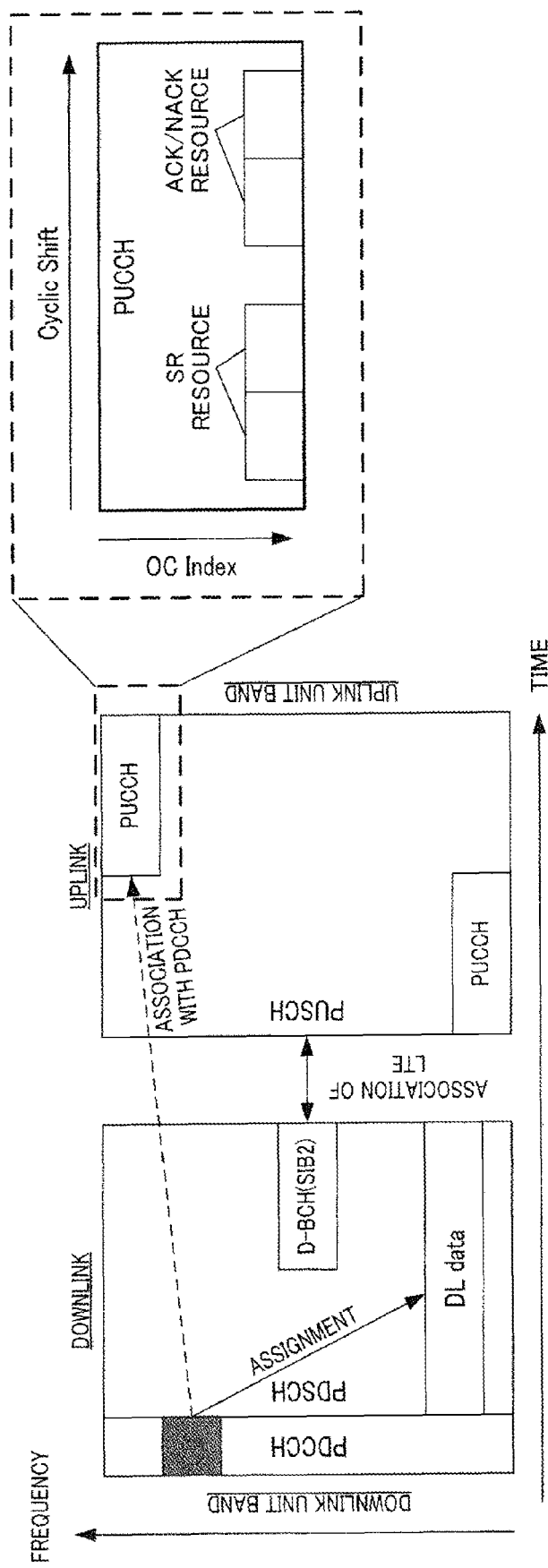
FIG. 2 illustrates a PUCCH when an SCTD is applied to transmission of an SR and a response signal.
Figure 3B:
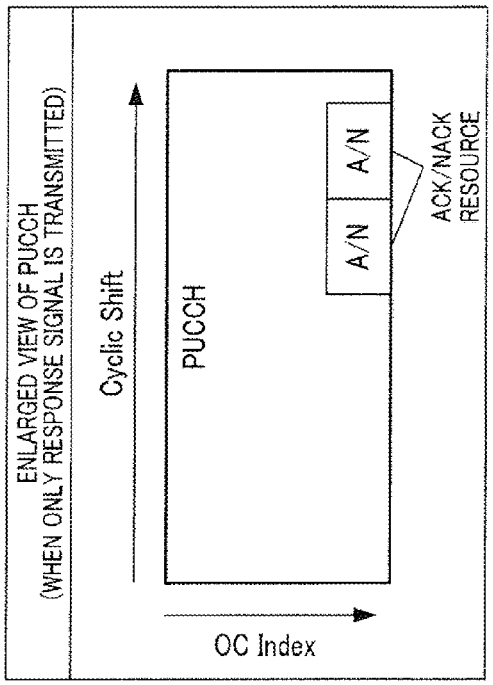
FIGS. 3A to 3C each illustrates a transmission control process of a terminal according to a generation status of an SR and a generation status of a response signal.
Figure 3A:
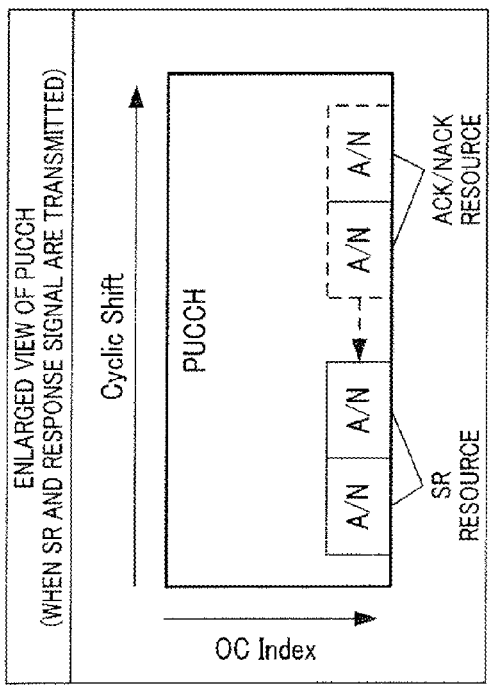
Figure 3C:
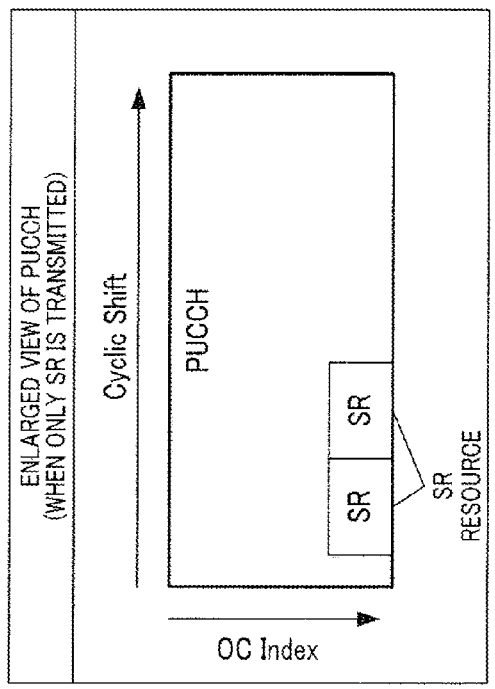

Further, terminal 200 specifies the ACK/NACK resource (FIG. 6A) associated with the CCE occupied by the downlink assignment control information received by its own terminal among a plurality of CCEs configuring the PDCCH of the downlink unit band illustrated in FIG. 2.

In FIG. 6A, the SR resource, the ACK/NACK resource, and the common resource are different code resources which differ in at least one of the ZAC sequence (primary spreading) and the OC index.

A description will be made below in connection with a detail operation of a transmission control process in terminal 200 (control section 208) according to a generation status of the SR and a generation status of the response signal (that is, a detection status of the uplink assignment control information by terminal 200) in a certain sub frame in the PUCCH of the uplink unit band illustrated in FIG. 6A with reference to FIGS. 6B to 6D.

<When SR and Response Signal have been Simultaneously Generated in Terminal 200 (FIG. 6B)>

In this case, control section 208 of terminal 200 outputs information (the cyclic shift index, the ZAC sequence, the frequency resource information, the Walsh sequence, and the DFT sequence) corresponding to the SR resource to uplink control channel signal generating section 213-1. Further, control section 208 outputs information (the cyclic shift index, the ZAC sequence, the frequency resource information, the Walsh sequence, and the DFT sequence) corresponding to the common resource to uplink control channel signal generating section 213-2.

Further, control section 208 instructs response signal generating section 212 to output the response signal input from CRC section 211 to uplink control signal generating sections 213-1 and 213-2.

Figure 6B:
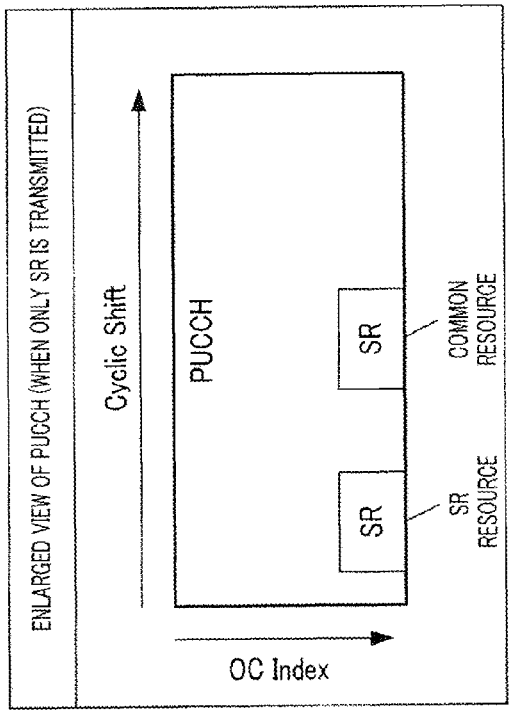

That is, when the SR and the response signal have been simultaneously generated in a certain sub frame, terminal 200 transmits the response signal ("A/N") to the downlink data using the SR resource and the common resource as illustrated in FIG. 6B. Specifically, terminal 200 transmits the same response signal through antenna 1 using the SR resource and transmits it through antenna 2 using the common resource. That is, terminal 200 transmits the same response signal assigned to each of the SR resource and the common resource which are different code resources through each of two antennas 1 and 2.

Then, deciding section 118 of base station 100 decides that terminal 200 has transmitted the SR based on the fact that the SR resource and the common resource are being used in the PUCCH of the uplink unit band illustrated in FIG. 6B. Further, base station 100 decides whether or not terminal 200 has transmitted any one of ACK and NACK as the response signal based on the phase of the signal received through the SR resource and the common resource (that is, based on a BPSK demodulation result).

<When Only Response Signal has been Generated in Terminal 200 (FIG. 6C)>

In this case, control section 208 of terminal 200 outputs information (the cyclic shift index, the ZAC sequence, the frequency resource information, the Walsh sequence, and the DFT sequence) corresponding to the ACK/NACK resource to uplink control channel signal generating section 213-1. Further, control section 208 outputs information (the cyclic shift index, the ZAC sequence, the frequency resource information, the Walsh sequence, and the DFT sequence) corresponding to the common resource to uplink control channel signal generating section 213-2.

Further, control section 208 instructs response signal generating section 212 to output the response signal input from CRC section 211 to uplink control signal generating sections 213-1 and 213-2.

Figure 6C:
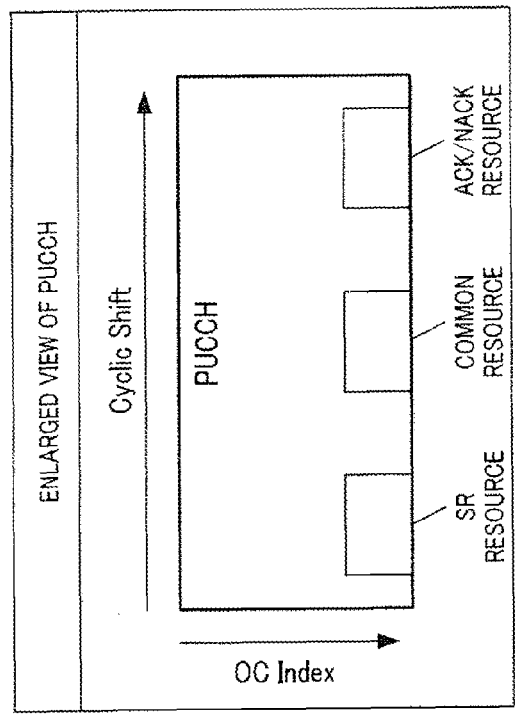

That is, when only the response signal has been generated in a, certain sub frame, terminal 200 transmits the response signal ("A/N") to the downlink data using the ACK/NACK resource and the common resource as illustrated in FIG. 6C. Specifically, terminal 200 transmits the same response signal through antenna 1 using the ACK/NACK resource and transmits it through antenna 2 using the common resource. That is, terminal 200 transmits the same response signal assigned to each of the ACK/NACK resource and the common resource which are different code resources through each of two antennas 1 and 2.

Then, deciding section 118 of base station 100 decides that terminal 200 has transmitted the response signal based on the fact that the ACK/NACK resource and the common resource are being used in the PUCCH of the uplink unit band illustrated in FIG. 6C. Further, base station 100 decides that terminal 200 has transmitted ACK or NACK as the response signal based on the phase of the response signal received through the ACK/NACK resource and the common resource.

<When Only SR has been Generated in Terminal 200 (FIG. 6D)>

In this case, control section 208 of terminal 200 outputs information (the cyclic shift index, the ZAC sequence, the frequency resource information, the Walsh sequence, and the DFT sequence) corresponding to the SR resource to uplink control channel signal generating section 213-1. Further, control section 208 outputs information (the cyclic shift index, the ZAC sequence, the frequency resource information, the Walsh sequence, and the DFT sequence) corresponding to the common resource to uplink control channel signal generating section 213-2.

Further, control section 208 instructs response signal generating section 212 to output "NACK" to uplink control signal generating sections 213-1 and 213-2.

Figure 6D:
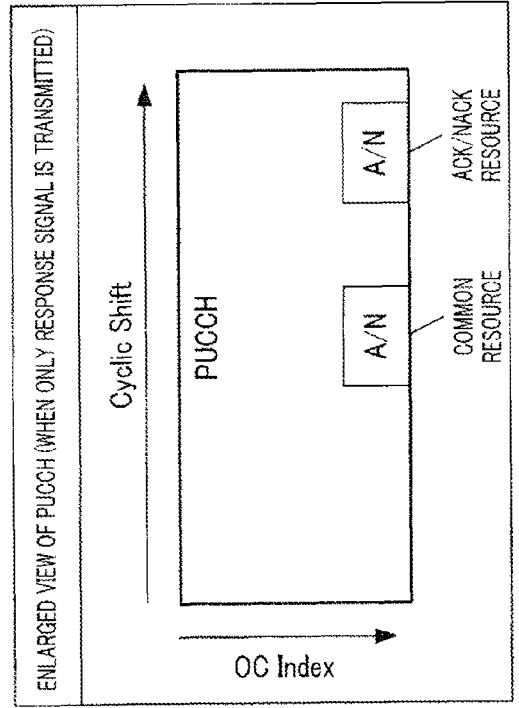

That is, when only the SR has been generated in a certain sub frame, terminal 200 transmits the SR having the same constellation point as "NACK" using the SR resource and the common resource as illustrated in FIG. 6D. That is, terminal 200 transmits NACK using the SR resource and the common resource illustrated in FIG. 6D. Specifically, terminal 200 transmits the same SR (NACK) through antenna 1 using the SR resource and transmits it through antenna 2 using the common resource. That is, terminal 200 transmits the same SR (NACK) assigned to each of the SR resource and the common resource which are different code resources through each of two antennas 1 and 2.

Here, the operation of terminal 200 illustrated in FIG. 6D (that is, the operation in which terminal 200 transmits only the SR) may be performed under the assumption of two situations: when only the SR has been generated in terminal 200 in a state in which the downlink data has not been assigned to terminal 200; and when the SR has been generated in a state in which terminal 200 has failed to receive the downlink assignment control information addressed to its own terminal.

In this regard, when the SR resource and the common resource are being used in the PUCCH of the uplink unit band illustrated in FIG. 6D and the SR transmitted at the same constellation point as NACK has been received, base station 100 decides whether the received SR is "SR+NACK" (that is, "assignment request+retransmission request" of the uplink data) or only the SR (that is, only the assignment request of the uplink data) depending on whether or not its own station has assigned the downlink data to terminal 200 (whether or not the downlink assignment control information has been transmitted). Then, when it is decided the received SR is "SR+NACK" (that is, "assignment request+retransmission request" of the uplink data), base station 100 performs the retransmission process of the downlink data as well as the resource assignment process for the uplink data.

As described above, since terminal 200 uses the same constellation point as NACK when transmitting only the SR, base station 100 can perform optimum retransmission control according to an assignment status by its own station regardless of whether or not base station 100 has not assign the downlink data or whether or not terminal 200 has failed to receive the downlink assignment control information.

<When Neither SR Nor Response Signal have been Generated in Terminal 200 (Not Shown)>

In this case, terminal 200 does not transmit the SR and the response signal in the PUCCH resource.

Hereinbefore, the detail operation of the transmission control process in terminal 200 (control section 208) according to the generation status of the SR and the generation status of the response signal have been described.

As described above, control section 208 of terminal 200 perform control such that the SR or the response signal is transmitted using any one code resource of the "SR resource" to which the response signal is assigned when the SR and the response signal have been simultaneously generated in a certain sub frame (FIG. 6B) and to which the SR is assigned when only the SR has been generated in a certain sub frame (FIG. 6D) and the "ACK/NACK resource" to which the response signal is assigned when only the response signal has been generated in a certain sub frame (FIG. 6C), and using the "common resource" to which the response signal is assigned when the SR and the response signal have been simultaneously generated in a certain sub frame (FIG. 6B) and when only the response signal has been generated in a certain sub frame (FIG. 6C) and to which the SR is assigned when only the SR has been generated in a certain sub frame (FIG. 6D), among the SR resource, the ACK/NACK resource, and the common resource which are different code resources.

That is, control section 208 of terminal 200 uses the common resource illustrated in FIG. 6A as the SR resource or the ACK/NACK resource according to the generation status of the SR and the generation status of the response signal. For example, when the SR has been generated as illustrated in FIGS. 6B and 6D, control section 208 uses the common resource as the SR resource, whereas when the SR has not been generated as illustrated in FIG. 6C, control section 208 uses the common resource as the ACK/NACK resource. Further, when the response signal has been generated as illustrated in FIGS. 6B and 6C, control section 208 assigns the response signal ("A/N") to the common resource, whereas when the response signal has not been generated as illustrated in FIG. 6D, control section 208 assigns the SR (NACK) to the common resource.

That is, when the SR and the response signal are simultaneously transmitted in a certain sub frame (FIG. 6B) and when only the SR is transmitted in a certain sub frame (FIG. 6D), terminal 200 transmits the same signal (the same response signal in FIG. 6B or the same SR (NACK) in FIG. 6D) through the two antennas using the SR resource and the common resource. Meanwhile, when only the response signal is transmitted in a certain sub frame (FIG. 6C), terminal 200 transmits the same response signal through the two antennas using the ACK/NACK resource and the common resource.

That is, terminal 200 consistently uses the common resource regardless of whether the SR and the response signal are simultaneously transmitted in a certain sub frame or any one of the SR and the response signal is independently transmitted. That is, terminal 200 transmits the SR or the response signal using either of the SR resource and the ACK/NACK resource, and the common resource among the different three code resources (the SR resource, the ACK/NACK resource, and the common resource illustrated in FIG. 6A). Thus, even when the SCTD is applied to transmission of the SR and the response signal, in terminal 200, any one resource (the common resource) of the two different code resources respectively corresponding to the two antennas is shared between the SR resource and the ACK/NACK resource. Accordingly, it is possible to suppress an increase in the amount of resources used for transmission of the SR and the response signal in the PUCCH of the uplink unit band.

For example, FIG. 2 is compared with FIGS. 6A to 6D according to the present embodiment. In FIG. 2, when the SCTD is applied to transmission of the SR and the response signal, it is necessary to prepare the two resources as the RS resource and the two resources as the ACK/NACK resources, that is, it is necessary to prepare a total of four resources. On the other hand, in the present embodiment, since base station 100 notifies terminal 200 of the common resource as illustrated in FIG. 6A, it is enough if only three resources of the SR resource, the ACK/NACK resource, and the common resource (the resource commonly used between the SR and the response signal) are prepared. That is, it is possible to suppress an increase in the amount of resources necessary for transmission of the SR and the response signal in the PUCCH of the uplink unit band.

Further, in FIG. 2, two resources (the two SR resources or the two ACK/NACK resources) which are a half of four resources (the two SR resources and the two ACK/NACK resources) are not consistently used in a certain sub frame. On the other hand, in the present embodiment, as illustrated in FIG. 6A, only one resource (the SR resource or the ACK/NACK resource) of three resources (the SR resource, the common resource, and the ACK/NACK resource) is not consistently used in a certain sub frame. That is, by suppressing an increase in the amount of resources which are not used in the PUCCH but wasted, a decrease in resource use efficiency can be suppressed.

As described above, according to the present embodiment, even when the SCTD is applied to transmission of the SR and the response signal, it is possible to suppress an increase in the overhead of the uplink control channel (PUCCH).

Embodiment 2

A decision method based on the likelihood after synchronization detection (likelihood decision) may be used as one of decision methods of, at the base station side, deciding which one of a set of the SR resource and the common resource and a set of the ACK/NACK resource and the common resource is being used by the terminal. Specifically, the base station performs synchronization detection on each of signals assigned to different code resources (for example, in Embodiment 1, the SR resource, the ACK/NACK resource, and the common resource). Next, the base station combines signals of the set of the SR resource and the common resource and signals of the set of the ACK/NACK resource and the common resource, for example, using maximum ratio combining (MRC) (which is also referred to as "MRC equalization") or the like.

Figure 7:
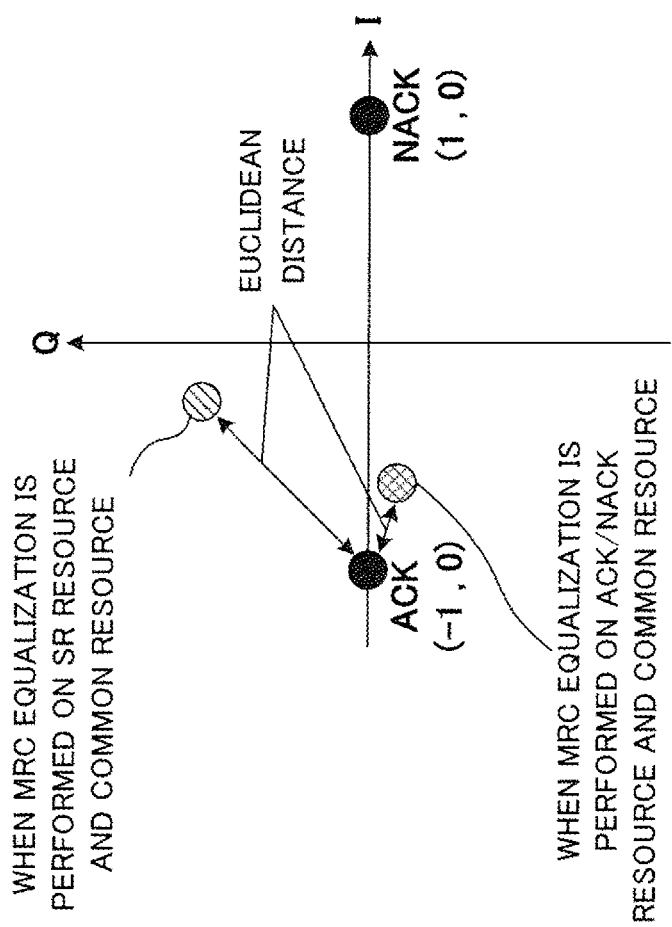
FIG. 7 illustrates a likelihood decision process in a base station according to Embodiment 2 of the present invention.

Then, the base station calculates the likelihood representing how close the combining results of the sets are to a constellation point of the response signal. For example, as illustrated in FIG. 7, the base station calculates the Euclidean distance between the combining result of each set and a closest constellation point (a constellation point (−1,0) in FIG. 7) of the response signal, and calculates the reciprocal of the Euclidean distance as the likelihood. Then, the base station decides a code resource of the set having the higher likelihood (that is, the set having the shorter Euclidean distance) as a code resource used by the terminal. In FIG. 7, the set of the ACK/NACK resource and the common resource is higher in the likelihood (shorter in the Euclidean distance) than the set of the SR resource and the common resource. Thus, in FIG. 7, the base station decides that the set of the ACK/NACK resource and the common resource is being used by the terminal.

A detailed description will be made in connection with the likelihood decision by the base station. Here, as a constellation point arrangement (constellation) of signals respectively assigned to different code resources (the SR resource, the ACK/NACK resource, and the common resource illustrated in FIG. 6A), for example, ACK is associated with a constellation point (−1,0), and NACK is associated with a constellation point (1,0) as illustrated in FIG. 7.

A description will be made below in connection with an example in which the SR and the response signal have been simultaneously generated in a certain sub frame (FIG. 6B). Further, a description will be made in connection with an example in which the response signal is ACK. That is, in the terminal, ACK (the constellation point) (−1,0)) is assigned to the SR resource and the common resource as illustrated in FIG. 7.

Figure 8A:
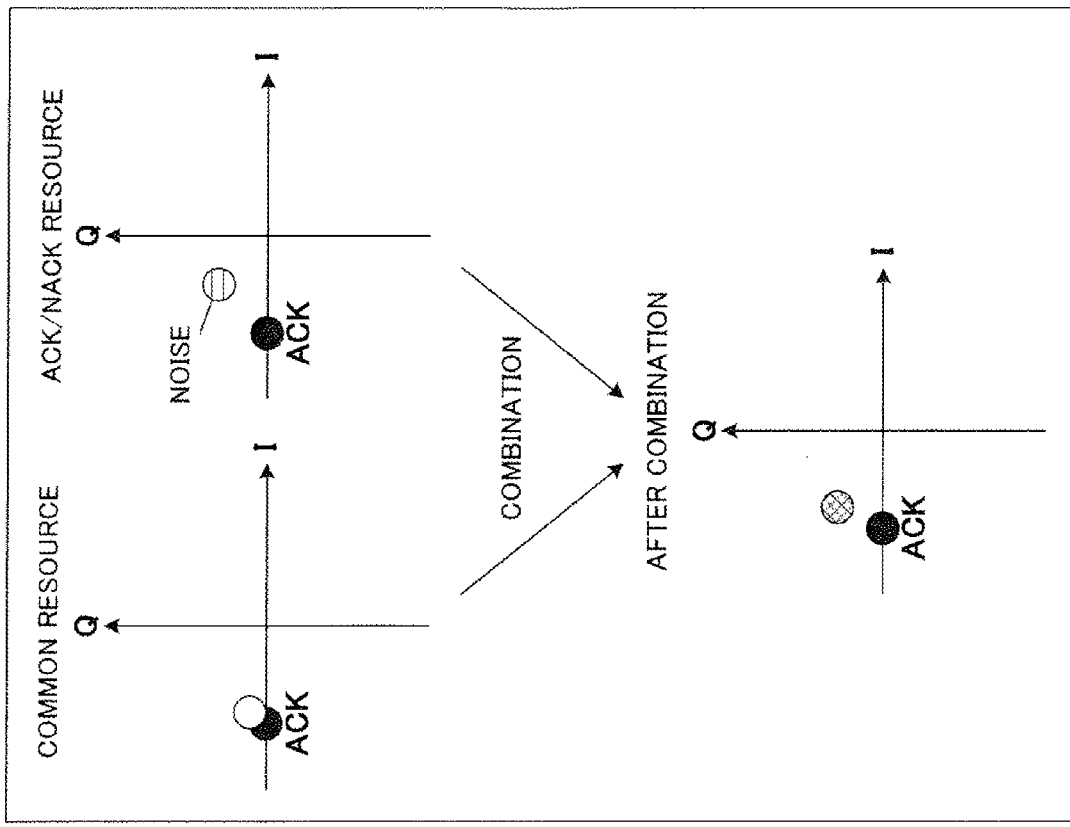
FIGS. 8A and 8B each illustrates a combining process in a base station according to Embodiment 2 of the present invention.
Figure 8B:
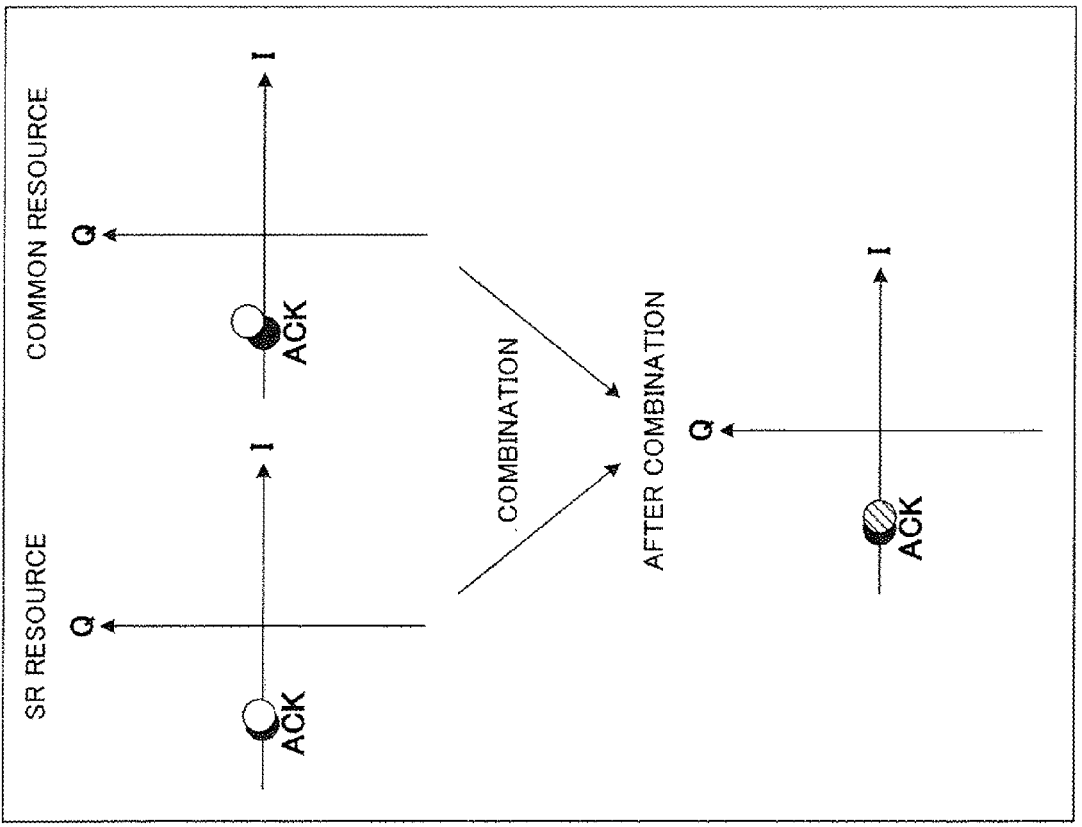

Thus, in the base station, as illustrated in FIGS. 8A and 8B, signal components (white circles illustrated in FIGS. 8A and 8B) appear near the constellation point (−1,0) of ACK (black circles illustrated in FIGS. 8A and 8B) in the SR resource and the common resource. In the terminal, nothing is assigned to the ACK/NACK resource, but in the base station, a noise component appears in the ACK/NACK resource as illustrated in FIG. 8B. Generally, the noise component appears at the position apart from the constellation point (−1,0) of ACK (the black circles illustrated in FIGS. 8A and 8B).

Then, the base station first combines the signal component assigned to the SR resource (near the constellation point (−1,0) in FIG. 8A) with the signal component (near the constellation point (−1,0) in FIG. 8A) assigned to the common resource as illustrated in FIG. 8A. As a result, a signal near the constellation point (−1,0) is obtained as a combining result as illustrated in FIG. 8A. In the same way, the base station combines the noise component present in the ACK/NACK resource with the signal component (near the constellation point (−1,0) in FIG. 8B) assigned to the common resource as illustrated in FIG. 8B. As a result, a signal near the constellation point (−1,0) is obtained as a combining result as illustrated in FIG. 8B.

Then, the base station compares the likelihood calculated using the Euclidean distance between the combining result and the closest ACK (the constellation point (−1,0)) illustrated in FIG. 8A with the likelihood calculated using the Euclidean distance between the combining result and the closest ACK (the constellation point (−1,0)) illustrated in FIG. 8B. However, as described above, since there is a high possibility that the noise component will appear at the position apart from the constellation point (−1,0) of ACK (the black circles illustrated in FIGS. 8A and 8B), there is a high possibility that the Euclidean distance between the combining result and the constellation point of ACK illustrated in FIG. 8B will be longer than the Euclidean distance between the combining result and the constellation point of ACK illustrated in FIG. 8A, as illustrated in FIGS. 8A and 8B.

Thus, since the set of the SR resource and the common resource illustrated in FIG. 8A is high in the likelihood (shorter in the Euclidean distance) than the set of the ACK/NACK resource and the common resource illustrated in FIG. 8B, the base station can decide that the set of the SR resource and the common resource has been used by the terminal. Thus, since the combining result of the set of the SR resource and the common resource is the constellation point (−1,0), the base station can decide that the response signal is ACK.

In the present embodiment, in order to further improve the accuracy of, at the base station, deciding the resource used by the terminal, the terminal sets different phase rotation amounts to a signal assigned to the common resource when the SR resource and the common resource are used (when the SR is generated) and a signal assigned to the common resource when the ACK/NACK resource and the common resource are used (when the SR is not generated).

The present embodiment will be concretely described below.

Figure 9:
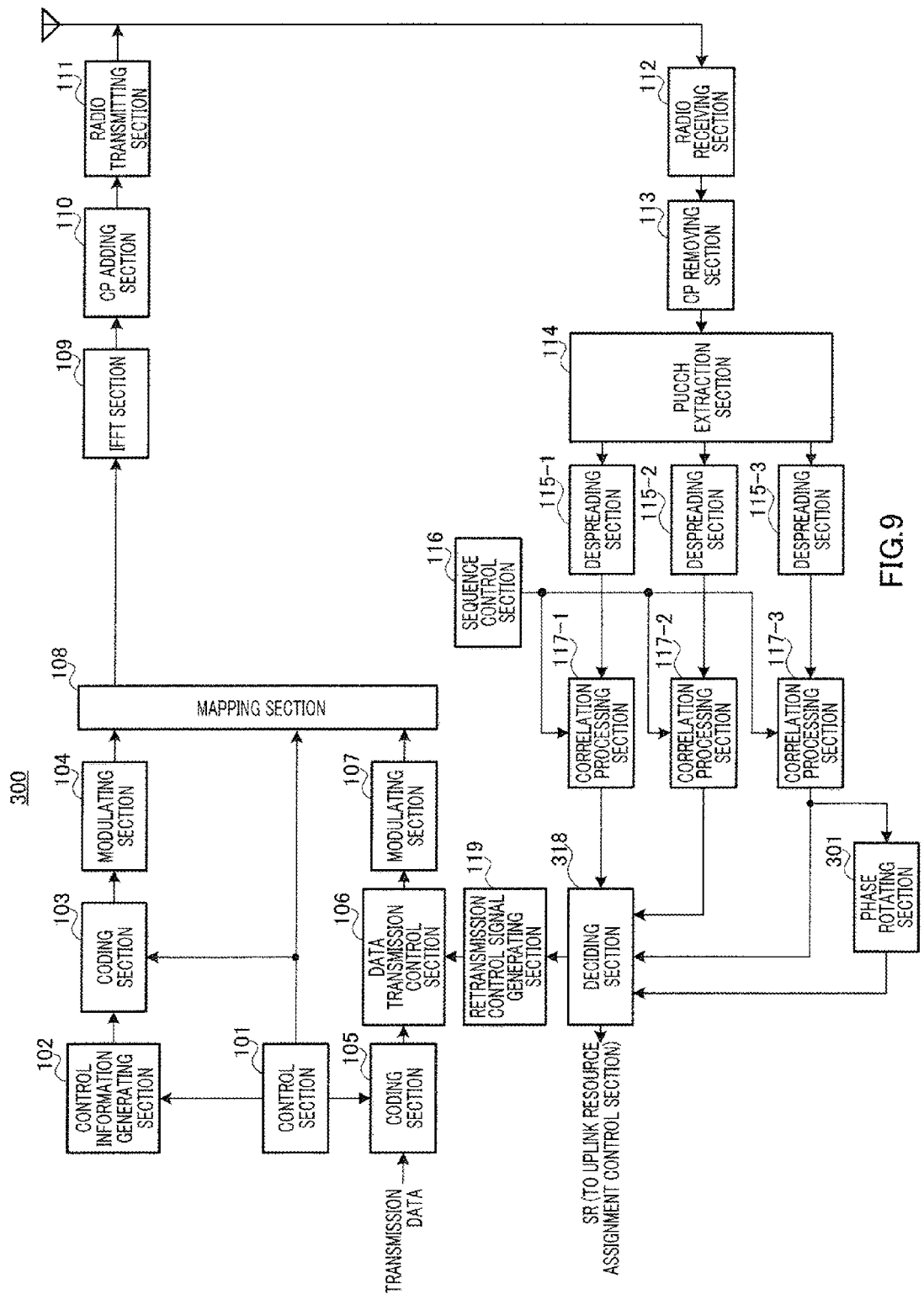
FIG. 9 is a diagram illustrating configuration of a base station according to Embodiment 2 of the present invention.

FIG. 9 illustrates a configuration of base station 300 according to the present embodiment. In FIG. 9, the same components as in base station 100 of FIG. 4 (Embodiment 1) are denoted by the same reference numerals, and a description thereof will be omitted.

In base station 300 illustrated in FIG. 9, correlation processing section 117-3 corresponding to the common resource outputs information related to the correlation value (the data portion and the reference signal portion) between the despread signal and the ZAC sequence to deciding section 318 and phase rotating section 301.

Phase rotating section 301 rotates a phase by a previously set angle (for example, −90°) only on the data portion (that is, $S_0$ to $S_3$ illustrated in FIG. 1) of a signal input from correlation processing section 117-3 (that is, multiplies the data portion by $\exp(-j\pi/2)$). The angle previously set in phase rotating section 301 is opposite in a direction to and is the same in the magnitude as an angle (90°) previously set in phase rotating section 401 (FIG. 10) of terminal 400, which will be described later. Further, phase rotating section 301 does not rotate a phase of the reference signal part (that is, $R_0$ to $R_2$ illustrated in FIG. 1) of the signal input from correlation processing section 117-3. Then, phase rotating section 301 outputs a signal obtained by rotating the phase of the data portion (a signal obtained by multiplying the data portion by $\exp(-j\pi/2)$) to deciding section 318.

Deciding section 318 decides whether or not the SR and the response signal are being transmitted from the terminal, based on the signal (correlation value) input from correlation processing sections 117-1 to 117-3 and phase rotating section 301. That is, deciding section 318 decides which one of the set of the SR resource and the common resource and the set of the ACK/NACK resource and the common resource is being used by terminal 400.

For example, deciding section 318 combines the signal input from correlation processing section 117-1 (the correlation value corresponding to the SR resource) with the signal (the correlation value (in which the phase of the data portion has been rotated) corresponding to the common resource) input from phase rotating section 301 by using, for example, an MRC. In the same way, deciding section 318 combines the signal input from correlation processing section 117-2 (the correlation value corresponding to the ACK/NACK resource) with the signal (the correlation value (in which the phase of the data portion has not been rotated) corresponding to the common resource) input from correlation processing section 117-3 by using, for example, an MRC.

Then, deciding section 318 calculates the Euclidean distance between the combining result of the set of the SR resource and the common resource and the constellation point of the response signal closest to the combining result of the set of the SR resource and the common resource, and the Euclidean distance between the combining result of the set of the ACK/NACK resource and the common resource and the constellation point of the response signal closest to the combining result of the set of the ACK/NACK resource and the common resource. Further, deciding section 318 calculates the likelihood representing how close the combining result of each set is to the constellation point of the response signal using the calculated Euclidean distance of each set. For example, deciding section 318 uses the reciprocal of the Euclidean distance of each set as the likelihood of each set. That is, the shorter the Euclidean distance is, the higher the likelihood becomes.

Then, deciding section 318 compares the likelihoods of the sets, and decides the set having the higher likelihood as the set being used by terminal 400. Specifically, when the set of the SR resource and the common resource is higher in the likelihood (shorter in the Euclidean distance from the constellation point of the response signal) than the set of the ACK/NACK resource and the common resource, deciding section 318 decides that the set of the SR resource and the common resource is being used by terminal 400. In this case, deciding section 318 decides that the SR is being transmitted from terminal 400 and thus outputs the SR to the uplink resource assignment control section (not illustrated).

On the contrary, when the set of the ACK/NACK resource and the common resource is higher in the likelihood (shorter in the Euclidean distance from the constellation point of the response signal) than the set of the SR resource and the common resource, deciding section 318 decides that the set of the ACK/NACK resource and the common resource is being used by terminal 400. In this case, deciding section 318 decides that the SR is not being transmitted from terminal 400 and thus does not output the SR to an uplink resource assignment control section (not illustrated).

Figure 10:
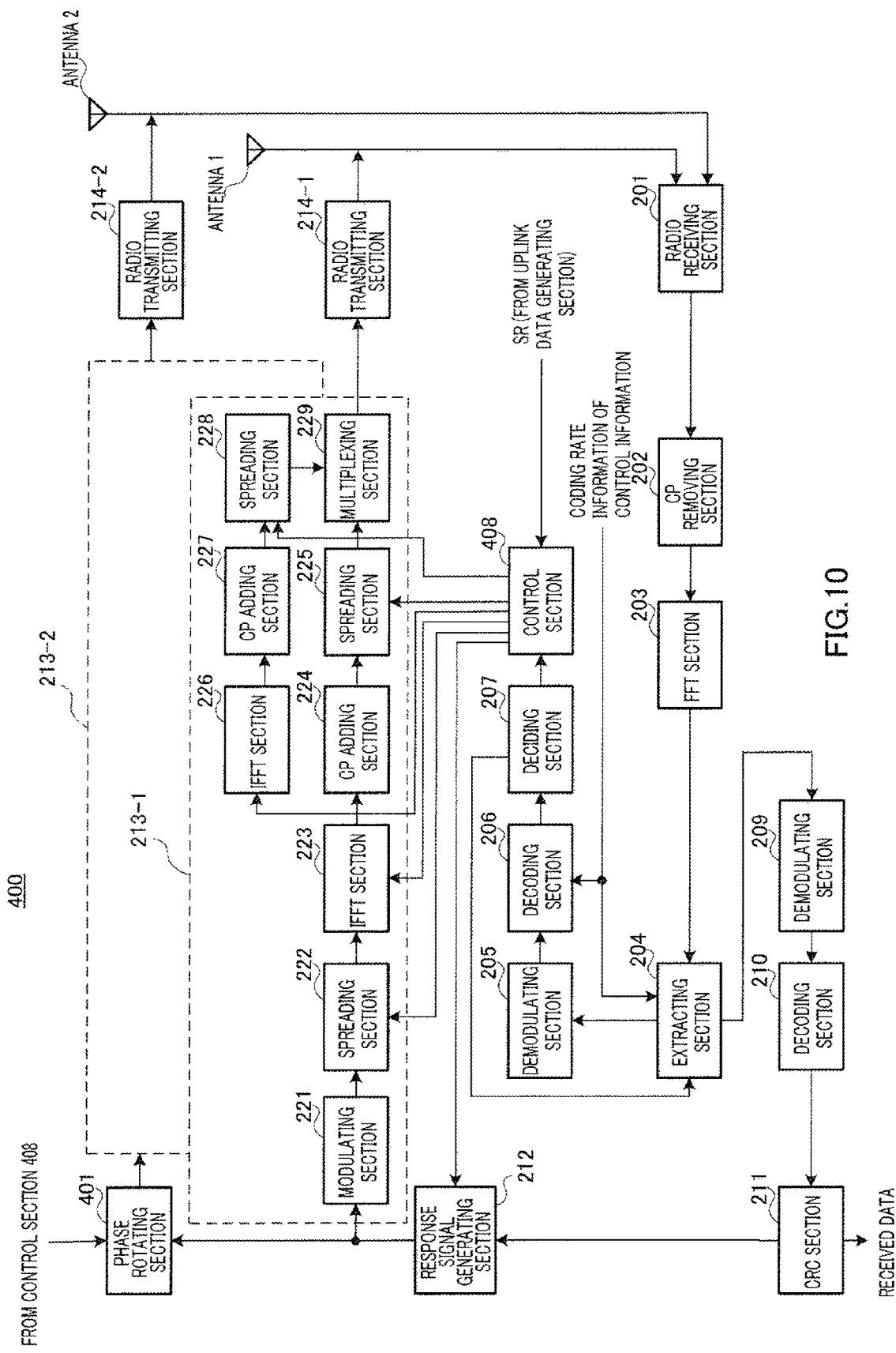
FIG. 10 is a block diagram illustrating a configuration of a terminal according to Embodiment 2 of the present invention.

Next, FIG. 10 illustrates a configuration of terminal 400 according to the present embodiment. In FIG. 10, the same components as in terminal 200 of FIG. 5 (Embodiment 1) are denoted by the same reference numerals, and thus a description thereof will be omitted.

In terminal 400 illustrated in FIG. 10, when the SR has been received from the uplink data generating section (not illustrated), similarly to Embodiment 1, control section 408 outputs information (the ZAC sequence, the cyclic shift index, the frequency resource information, the Walsh sequence, and the DFT sequence) corresponding to the SR resource to uplink control channel signal generating section 213-1, and outputs an instruction signal (for multiplying a signal by $\exp(j\pi/2)$) to phase rotating section 401 to rotate a phase of a signal by a previously set angle (for example, 90°). However, when the SR has not been received from the uplink data generating section (not illustrated), control section 408 outputs information (the ZAC sequence, the cyclic shift index, the frequency resource information, the Walsh sequence, and the DFT sequence) corresponding to the ACK/NACK resource to uplink control channel signal generating section 213-1, and outputs an instruction signal to phase rotating section 401 not to rotate a phase of a signal.

Response signal generating section 212 outputs a generated response signal or a NACK (when an instruction is given from control section 408) to modulating section 221 of uplink control channel signal generating section 213-1, and phase rotating section 401.

Phase rotating section 401 decides whether or not the phase of the signal input from the response signal generating section 212 is to rotate in response to the instruction signal from control section 408. Specifically, when the instruction signal for rotating the phase of the signal is input from control section 408, phase rotating section 401 rotates the phase of the signal by 90° (multiplies the signal by $\exp(j\pi/2)$. However, when the instruction signal for rotating the phase of the signal is not input from control section 408, phase rotating section 401 does not rotate the phase of the signal (does not multiply the signal by $\exp(j\pi/2)$. Then, phase rotating section 401 outputs the signal, which has been subjected to the phase rotation process in response to the instruction signal (that is, the signal whose phase has been rotated or the signal whose phase has not been rotated), to modulating section 221 of uplink control channel signal generating section 213-2 corresponding to the common resource.

Next, a description will be made in connection with an operation of terminal 400 (FIG. 10). In the following description, similarly to Embodiment 1, base station 300 (FIG. 9) notifies terminal 400 of one information related to the SR resource and one information related to the common resource in advance, in the uplink unit band illustrated in FIG. 2 (the uplink unit band set to terminal 400), as illustrated in FIG. 6A. That is, control section 408 of terminal 400 retains the information related to the SR resource and the information related to the common resource, which are notified from base station 300. Further, terminal 400 specifies the ACK/NACK resource (FIG. 6A) associated with the CCE occupied by the downlink assignment control information received by its own terminal.

A description will be made below in connection with a detailed operation of a transmission control process in terminal 400 according to a generation status of the SR and a generation status of the response signal, in a certain sub frame in the PUCCH of the uplink unit band illustrated in FIG. 6A, with reference to FIG. 11, similarly to Embodiment 1.

In the following description, it is assumed that an angle previously set to phase rotating section 301 and an angle previously set to phase rotating section 401 are −90° and 90°, respectively. That is, values to be multiplied to the signal, which are previously set to phase rotating section 301 and phase rotating section 401, are $\exp(-j\pi/2)$ and $\exp(j\pi/2)$. Further, as a constellation point arrangement (constellation) of response signals generated by response signal generating section 212, ACK is associated with a constellation point (−1,0), and NACK is associated with a constellation point (1,0).

<When SR and Response Signal have been Simultaneously Generated in Terminal 400>

In this case, terminal 400 transmits a response signal ("A/N") to downlink data using the SR resource and the common resource, similarly to Embodiment 1 (FIG. 6B). Specifically, control section 408 of terminal 400 performs control such that the same response signal is transmitted through antenna 1 using the SR resource and through antenna 2 using the common resource.

Further, control section 408 instructs response signal generating section 212 to output the response signal input from CRC section 211 to modulating section 221 of uplink control signal generating sections 213-1, and to phase rotating section 401.

Further, control section 408 outputs an instruction signal to phase rotating section 401 to rotate the phase of the response signal input from response signal generating section 212 by 90° (to multiply the response signal by $\exp(j\pi/2)$).

Then, phase rotating section 401 rotates the phase of the response signal input from response signal generating section 212 by 90° (that is, multiplies the response signal by $\exp(j\pi/2)$).

Figure 11:
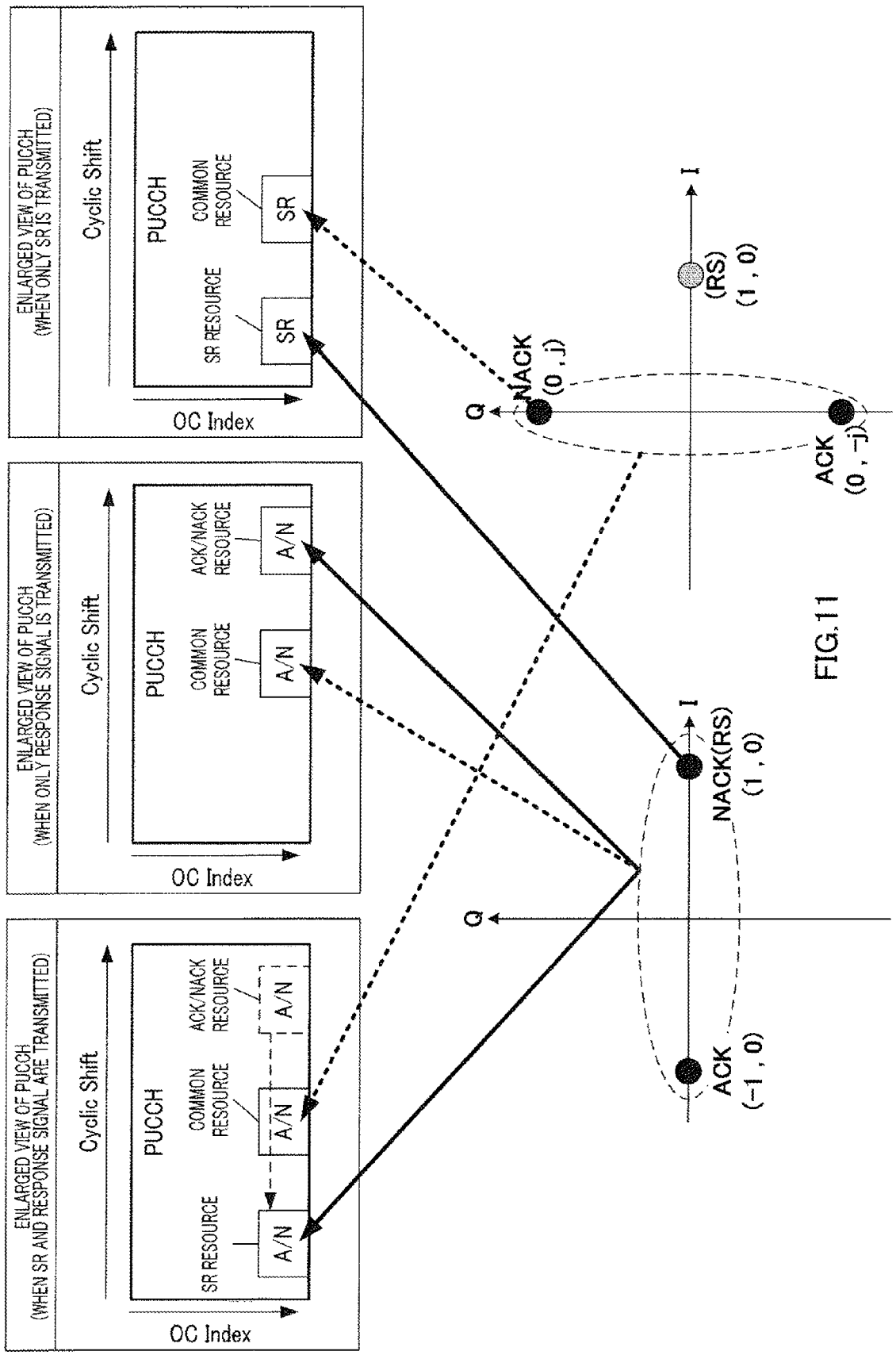
FIG. 11 illustrates an operation of a terminal according to Embodiment 2 of the present invention.

That is, when the SR and the response signal have been simultaneously generated in a certain sub frame ("when SR and response signal are transmitted" illustrated in FIG. 11), in the SR resource, as a constellation point arrangement of the response signal ("A/N"), ACK is associated with the constellation point (−1,0), and NACK is associated with the constellation point (1,0) as illustrated in FIG. 11. On the other hand, in the common resource, as a constellation point arrangement of the response signal ("A/N"), ACK is associated with the constellation point (0,−j), and NACK is associated with the constellation point (0,j) as illustrated in FIG. 11. That is, when the SR and the response signal have been simultaneously generated in a certain sub frame, terminal 400 rotates the constellation of the response signal assigned to the common resource by 90° with respect to the constellation of the response signal assigned to the SR resource. As a result, there is a difference of 90° between the constellation of the response signal assigned to the SR resource, and the constellation of the response signal assigned to the common resource.

However, terminal 400 rotates the phase of the response signal through phase rotating section 401 but does not rotate the phase of the reference signal (RS in FIG. 11). Thus, the reference signals (RS) respectively transmitted through the SR resource and the common resource are associated with the same constellation point (1,0), as illustrated in FIG. 11.

<When Only Response Signal has been Generated in Terminal 400>

In this case, terminal 400 transmits a response signal ("A/N") with respect to downlink data, using the ACK/NACK resource and the common resource, similarly to Embodiment 1 (FIG. 6C). Specifically, control section 408 of terminal 400 performs control such that the same response signal is transmitted through antenna 1 using the ACK/NACK resource and through antenna 2 using the common resource.

Further, control section 408 instructs response signal generating section 212 to output the response signal input from CRC section 211 to modulating section 221 of uplink control signal generating sections 213-1, and phase rotating section 401.

Further, control section 408 outputs an instruction signal to phase rotating section 401 not to rotate the phase of the response signal input from response signal generating section 212 (not to multiply the response signal by $\exp(j\pi/2)$).

Then, without rotating the phase of the response signal input from response signal generating section 212, phase rotating section 401 outputs the response signal to modulating section 221 of uplink control channel signal generating section 213-2.

That is, when only the response signal has been generated in a certain sub frame ("when only response signal is transmitted" illustrated in FIG. 11), in the ACK/NACK resource, as a constellation point arrangement of the response signal ("A/N"), ACK is associated with the constellation point (−1, 0), and NACK is associated with the constellation point (1,0) as illustrated in FIG. 11. Further, in the common resource, as a constellation point arrangement of the response signal ("A/N"), ACK is associated with the constellation point (−1,0), and NACK is associated with the constellation point (1,0) as illustrated in FIG. 11. That is, when only the response signal has been generated in a certain sub frame, the constellation of the response signal assigned to the ACK/NACK resource is identical to the constellation of the response signal assigned to the common resource.

<When Only SR has been Generated in Terminal 400>

In this case, terminal 400 transmits the SR using the same constellation point as "NACK" through the SR resource and the common resource, similarly to Embodiment 1 (FIG. 6D). Specifically, control section 408 of terminal 400 performs control such that the same SR(NACK) is transmitted through antenna 1 using the SR resource and through antenna 2 using the common resource.

Further, control section 408 instructs response signal generating section 212 to output "NACK" to modulating section 221 of uplink control signal generating sections 213-1, and phase rotating section 401.

Further, control section 408 outputs an instruction signal to phase rotating section 401 to rotate the phase of the signal (NACK) input from response signal generating section 212 by 90° (to multiply the signal (NACK) by $\exp(j\pi/2)$).

Then, phase rotating section 401 rotates the phase of the signal input from response signal generating section 212 by 90° (multiplies the signal (NACK) by $\exp(j\pi/2)$).

That is, when only the SR has been generated in a certain sub frame ("when only SR is transmitted" illustrated in FIG. 11), in the SR resource, the signal (NACK) is associated with the constellation point (1,0) as illustrated in FIG. 11. On the other hand, in the common, resource, the signal (NACK) is associated with the constellation point (0,j) as illustrated in FIG. 11. That is, when only the SR has been generated in a certain sub frame, terminal 400 rotates the constellation of the SR (NACK) assigned to the common resource by 90° with respect to the constellation of the SR (NACK) assigned to the SR resource. As a result, there is a difference of 90° between the constellation of the SR (NACK) assigned to the SR resource and the constellation of the SR assigned to the common resource.

However, similarly to "when SR and response signals are transmitted" illustrated in FIG. 11, terminal 400 rotates the phase of only the signal (NACK) through phase rotating section 401 but does not rotate the phase of the reference signal (RS in FIG. 11). Thus, the reference signals (RS) respectively transmitted through the SR resource and the common resource are associated with the same constellation point (1,0) as illustrated in FIG. 11.

<When Neither SR Nor Response Signal has been Generated in Terminal 400 (Not Illustrated)>

In this case, terminal 400 does not transmit the SR and the response signal in the PUCCH resource.

Hereinbefore, the detailed operation of the transmission control process in terminal 400 according to the generation status of the SR and the generation status of the response signal has been described.

Next, an operation of base station 300 according to the present embodiment will be described. A description will be made below in connection with an example in which the SR and the response signal have been simultaneously transmitted in a certain sub frame ("when SR and response signals are transmitted" illustrated in FIG. 11). Further, a description will be made in connection with an example in which the response signal is ACK. That is, in terminal 400, ACK (the constellation point) (−1,0)) is assigned to the SR resource, and ACK (the constellation point (0,−j)) is assigned to the common resource as illustrated in FIG. 11. Further, of the data portion and the reference signal portion of the signal assigned to each resource, only a component of the data portion is illustrated in FIGS. 12A and 12B.

Figure 12A:
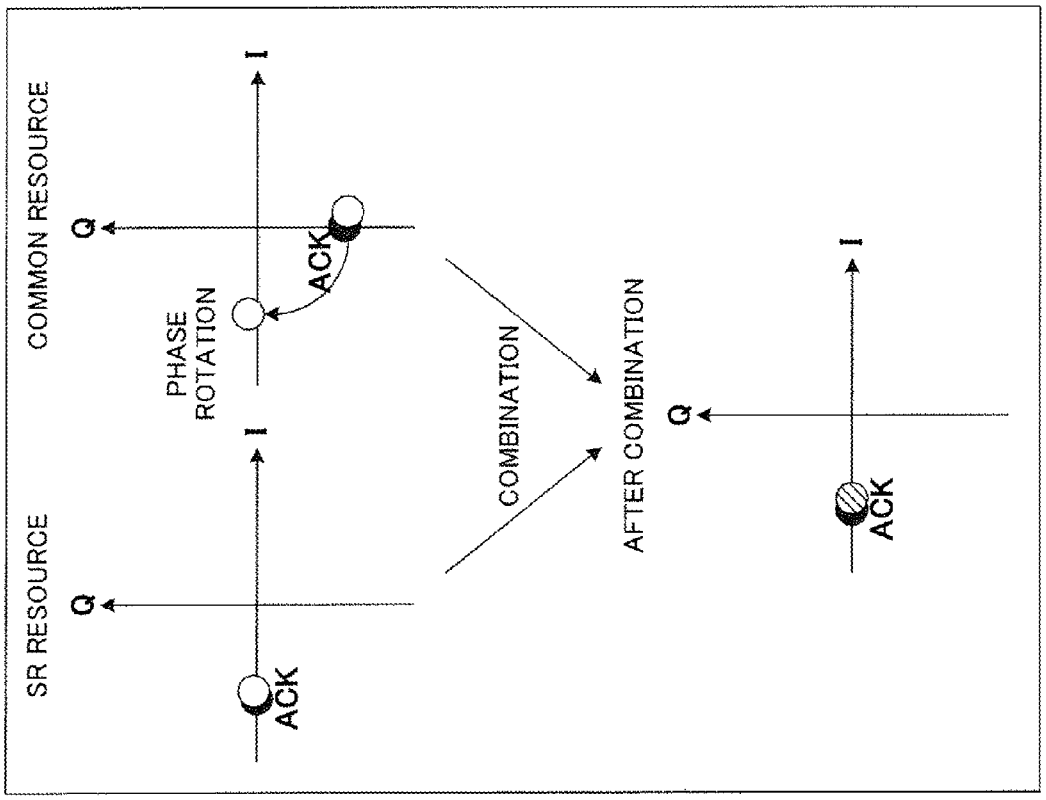
FIGS. 12A and 12B each illustrates an operation of a base station according to Embodiment 2 of the present invention.
Figure 12B:
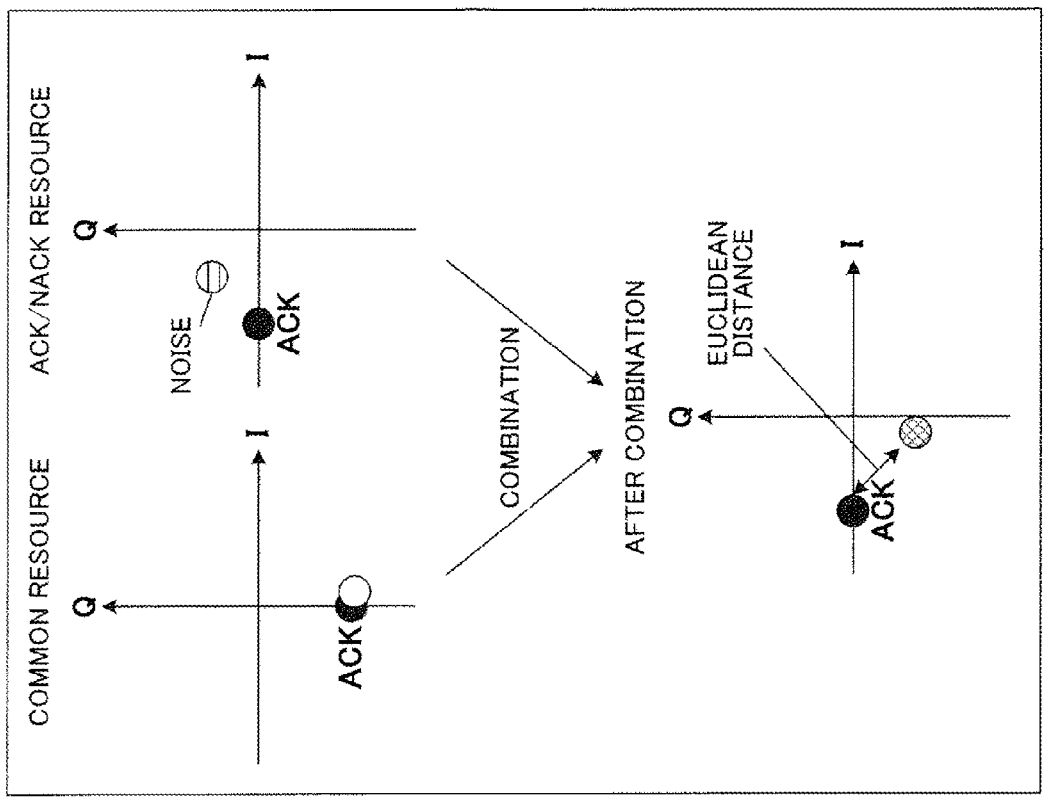

In base station 300, as illustrated in FIG. 12A, a signal component (a white circle in the SR resource illustrated in FIG. 12A) assigned to the SR resource appears near the constellation point (−1,0) of ACK (a black circle in the SR resource illustrated in FIG. 12A), and a signal component (a white circle in the common resource illustrated in FIG. 12A) assigned to the common resource appears near the constellation point (0,−j) of ACK (a black circle in the common resource illustrated in FIG. 12A). Further, in terminal 400, nothing is assigned to the ACK/NACK resource, but in base station 300, a noise component appears in the ACK/NACK resource as illustrated in FIG. 12B. Generally, the noise component appears at the position apart from the constellation point (−1,0) of ACK (the black circle in the ACK/NACK resource illustrated in FIG. 12B).

When the likelihood is obtained on the set of the SR resource and the common resource, phase rotating section 301 of base station 300 rotates the phase of the signal component (near the constellation point (0,−j) of ACK in the common resource of FIG. 12A) obtained in the common resource by −90° (multiplies the data portion of the correlation value by $\exp(-j\pi/2)$) as illustrated in FIG. 12A. As a result, the signal component whose phase has been rotated is near the constellation point (−1,0) as illustrated in the common resource of FIG. 12A.

Then, deciding section 318 first combines the signal component assigned to the SR resource (near the constellation point (−1,0) in FIG. 12A) with the signal component input from phase rotating section 301 (that is, the signal component obtained by rotating the signal component assigned to the common resource by −90° (a result of multiplying the signal component by exp(−jπ/2)). As a result, a signal near the constellation point (−1,0) is obtained as a combining result as illustrated in FIG. 12A.

In the same way, when the likelihood is obtained on the set of the ACK/NACK resource and the common resource, deciding section 318 combines the component (the noise component in FIG. 12B) present in the ACK/NACK resource with the signal component (near the constellation point (0,−j) in FIG. 12B) assigned to the common resource, as illustrated in FIG. 12B. As a result, a signal near the constellation point (0,−j) is obtained as a combining result as illustrated in FIG. 12B.

Next, deciding section 318 compares the likelihood calculated using the Euclidean distance between the combined signal component (the combining result) and ACK (the constellation point (−1,0)) illustrated in FIG. 12A with the likelihood calculated using the Euclidean distance between the signal component (the combining result) and ACK (the constellation point (−1,0)) illustrated in FIG. 12B. Thus, since the set of the SR resource and the common resource illustrated in FIG. 12A is higher in the likelihood (shorter in the Euclidean distance) than the set of the ACK/NACK resource and the common resource illustrated in FIG. 12B, deciding section 318 decides that the set of the SR resource and the common resource has been used by terminal 400. Thus, since the combining result of the set of the SR resource and the common resource is near the constellation point (−1,0), deciding section 318 decides that the response signal is ACK.

In the above described way, when the SR and the response signal have been simultaneously generated in a certain sub frame and when only the SR has been generated in a sub frame, terminal 400 rotates the constellation of the signal assigned to the common resource by 90° with respect to the constellation of the signal assigned to the SR resource (multiplies the signal by exp(jπ/2)). That is, when the SR and the response signal have been simultaneously generated in a certain sub frame and when only the SR has been generated in a sub frame, terminal 400 sets the constellation of the signal assigned to the SR resource to be different from the constellation of the signal assigned to the common resource as illustrated in FIG. 11.

Meanwhile, when only the response signal has been generated in a certain sub frame, terminal 400 sets the constellation of the signal assigned to the ACK/NACK resource to be identical to the constellation of the signal assigned to the common resource as illustrated in FIG. 11.

That is, terminal 400 changes the phase rotation amount of the signal (the SR or the response signal) assigned to the common resource according to whether or not the SR has been generated, regardless of whether or not the response signal has been generated in the same sub frame.

That is, terminal 400 sets a phase difference (90° in FIG. 11) between a constellation point (ACK (−1,0) and NACK (1,0) in FIG. 11) for obtaining a signal assigned to the SR resource and a constellation point (ACK (0,−j) and NACK (0,j) in FIG. 11) for obtaining a signal assigned to the common resource when the SR and the response signal have been simultaneously generated in a certain sub frame and when only the SR has been generated in a certain sub frame to be difference from a phase difference (Vin FIG. 11) between a constellation point (ACK (−1,0) and NACK (1,0) in FIG. 11) for obtaining a signal assigned to the ACK/NACK resource and a constellation point (ACK (−1,0) and NACK (1,0) in FIG. 11) for obtaining a signal assigned to the common resource when only the response signal has been generated in a certain sub frame.

Specifically, as illustrated in FIG. 11, terminal 400 sets a phase difference (90° (π/2 radians)) between constellation points (the constellation point (−1,0) in the SR resource and the constellation point (0,−j) in the common resource) at which signals having the same content (for example, ACK representing that there is no error) are arranged in the SR resource and the common resource when the SR and the response signal have been simultaneously generated in a certain sub frame and when only the SR has been generated in a certain sub frame to be difference from a phase difference (0°) between constellation points (the constellation point (−1,0) in the SR resource and the constellation point (−1,0) in the common resource) at which signals having the same content (for example, ACK) are arranged in the ACK/NACK resource and the common resource when only the response signal has been generated in a certain sub frame. Further, the above description is similarly applied to NACK representing that there is an error.

Further, terminal 400 maximize a difference (here, 90° (that is, π/2 radians)) between a phase difference between constellation points at which signals having the same content (ACK or NACK) are arranged through the SR resource and the common resource when the SR and the response signal have been simultaneously generated in a certain sub frame and when only the SR has been generated in a certain sub frame, and a phase difference between constellation points at which signals having the same content (ACK or NACK) are arranged through the ACK/NACK resource and the common resource when only the response signal has been generated in a certain sub frame.

Then, base station 300 performs phase rotation on the data portion of the common resource in a direction reverse to terminal 400 when the likelihood is obtained on the set of the SR resource and the common resource, but does not perform phase rotation on the data portion of the common resource when the likelihood is obtained on the set of the ACK/NACK resource and the common resource. That is, when the set of the SR resource and the common resource has been used by terminal 400 (that is, when terminal 400 performs phase rotation on the common resource), base station 300 performs phase rotation reverse to terminal 400 on the common resource in the set of the correct resources (that is the set of the SR resource and the common resource), but does not perform phase rotation on the common resource in the set of wrong resources (that is, the set of the ACK/NACK resource and the common resource). In the same way, when the set of the ACK/NACK resource and the common resource has been used by terminal 400 (that is, when terminal 400 does not perform phase rotation on the common resource), base station 300 does not perform phase rotation on the common resource in the set of the correct resources (that is the set of the ACK/NACK resource and the common resource), but performs phase rotation on the common resource in the set of wrong resources (that is, the set of the SR resource and the common resource).

Thus, in base station 300, a phase difference corresponding to the phase rotation amount occurs between a combining result obtained by the MRC in the set of the wrong resources, of the set of the SR resource and the common resource and the set of the ACK/NACK resource and the common resource, and the constellation point of the response signal. For example, in FIG. 12A, a combining result (near the combined constellation point (−1,0)) obtained by the MRC in the set of the SR resource and the common resource (herein, the set of the correct resources) is positioned near the constellation point (−1,0) of the response signal. On the other hand, in FIG. 12B, a combining result (near the combined constellation point (0,−j)) obtained by the MRC in the set of the ACK/NACK resource and the common resource (herein, the set of the wrong resources) is positioned at the position in which the phase difference with the constellation point (−1,0) of the response signal is almost 90° ($\pi/2$ radians) (i.e., at the position apart by the phase rotation amount, which is provided by terminal 400).

That is, in base station 300, there is a high possibility that the combining result of the set of the wrong resources (that is, the set of resources not used by terminal 400), of the set of the SR resource and the common resource and the set of the ACK/NACK resource and the common resource, is significantly distanced from the constellation point of the response signal.

Thus, in base station 300, there is a high possibility that the likelihood calculated based on the set of the wrong resources (for example, in FIGS. 12A and 12B, the set of the ACK/NACK resource and the common resource illustrated in FIG. 12B) will be significantly lower than the likelihood calculated based on the set of the correct resources (for example, in FIGS. 12A and 12B, the set of the SR resource and the common resource illustrated in FIG. 12A). For example, when FIG. 8B (when phase rotation is not performed on the common resource) is compared with FIG. 12B (when phase rotation is performed on the common resource), the example of FIG. 8B is longer in the Euclidean distance between the combining result and the constellation point of the response signal in the set of the wrong resources (here, the set of the ACK/NACK resource and the common resource) than the example of FIG. 12B. That is, the likelihood of the set of the wrong resources in FIG. 12B is significantly lower than the likelihood of the set of the wrong resources in FIG. 8B. That is, the difference between the likelihood of the set of the correct resources in FIG. 12A and the likelihood of the set of the wrong resources in FIG. 12B is larger than the difference between the likelihood of the set of the correct resources in FIG. 8A and the likelihood of the set of the wrong resources in FIG. 8B.

As described above, base station 300 can significantly change the difference between the likelihood of the set of the correct resources and the likelihood of the set of the wrong resources. Thus, it is possible to improve the decision accuracy of deciding which one of the set of the SR resource and the common resource and the set of the ACK/NACK resource and the common resource has been used by terminal 400.

Thus, according to the present embodiment, similarly to Embodiment 1, even when the SCTD is applied to transmission of the SR and the response signal, it is possible to suppress an increase in the overhead of the uplink control channel (PUCCH), and further, it is possible to improve the accuracy of, at the base station, deciding the resource used by the terminal.

Further, the present embodiment has been described in connection with the example in which the constellation of the common resource is rotated by 90° with respect to the constellation of the SR resource (the signal of the common resource is multiplied by $\exp(j\pi/2)$). However, in the present invention, among a plurality of constellation points included in the same constellation, the constellation point used by the SR resource may be set to be different from the constellation point used by the common resource. For example, among four constellation points included in a constellation of QPSK, two constellation points may be used by the SR resource, and two constellation points other than the two constellation points used by the SR resource may be used by the common resource. In this case, similarly to the present embodiment, it is possible to set a phase difference between a constellation point for obtaining a signal assigned to the SR resource and a constellation point for obtaining a signal assigned to the common resource when the SR resource and the common resource are used to be different from a phase difference between a constellation point for obtaining a signal assigned to the ACK/NACK resource and a constellation point for obtaining a signal assigned to the common resource when the ACK/NACK resource and the common resource are used. That is, even when the constellation point used by the SR resource is set to be different from the constellation point used by the common resource in the same constellation (that is, when phase rotation is not performed), similarly to the present embodiment, the decision accuracy of, at the base station, the resource used by the terminal can be improved.

Further, in the present embodiment, an operation of rotating (phase-rotating) the constellation of the common resource by 90° with respect to the constellation of the SR resource when the SR has been generated at the terminal side, that is, an operation of multiplying the signal of the common resource by $\exp(j\pi/2)$ may be called scrambling regarding $\exp(j\pi/2)$ as a scrambling code. In this case, phase rotating section 401 may be called a scrambling section.

Further, the present embodiment has been described in connection with the example in which processing is performed at the terminal side in an order in which phase rotation (multiplication by $\exp(j\pi/2)$ which is a scrambling code) is performed, and then primary spreading and secondary spreading are performed. However, an order of the scrambling process, the primary spreading and secondary spreading processes are not limited thereto. That is, since all of the scrambling process, the primary spreading process, and the secondary spreading process are represented by multiplication, for example, the same effect as in the present embodiment is obtained even by firstly performing the primary spreading process or the secondary spreading process on the response signal, and then multiplying the spread response signal by the scrambling code.

Further, the present embodiment has been described in connection with the example in which the constellation of the common resource is rotated by 90° with respect to the constellation of the SR resource when the SR has been generated at the terminal side. However, the same effect as in the present embodiment is obtained even when the terminal side rotates the constellation of the common resource by arbitrary angle θ (radian) with respect to the constellation of the SR resource (the signal of the common resource is multiplied by $\exp(j\theta)$). For example, as a representative rotation angle, there is −90° (that is, when the signal of the common resource is multiplied by $\exp(-j\pi/2)$) in addition to 90°.

Embodiment 3

The present embodiment is different from Embodiment 2 in that downlink data (which is called "semi-persistent scheduling (SPS)") not including downlink assignment control information, which is transmitted from the base station to the terminal, is handled.

The present embodiment will be concretely described below.

Figure 13:
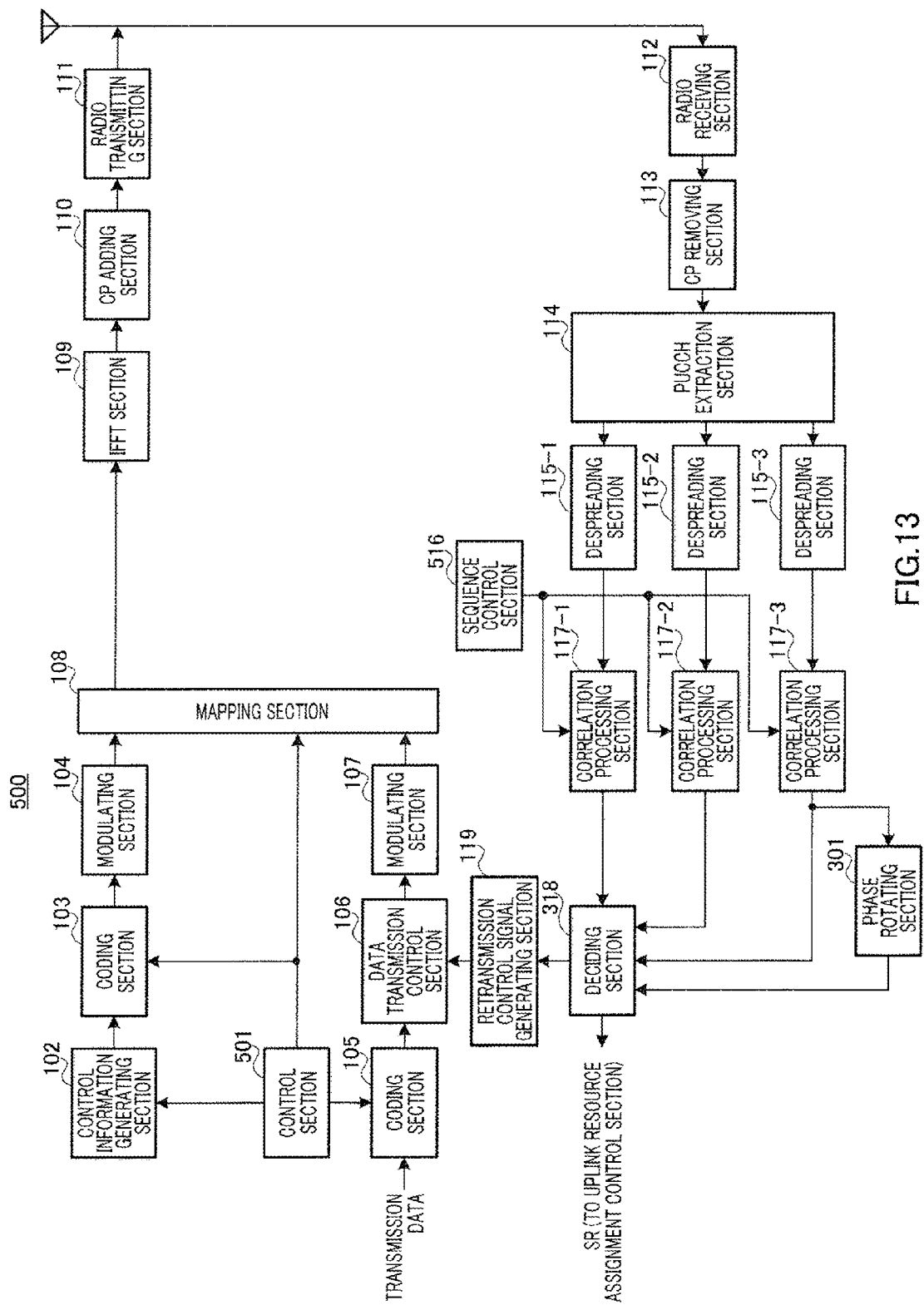
FIG. 13 is a diagram illustrating a configuration of a base station according to Embodiment 3 of the present invention.

FIG. 13 illustrates a configuration of base station 500 according to the present embodiment. In FIG. 13, the same components as in base station 300 of FIG. 9 (Embodiment 2) are denoted by the same reference numerals, and a description thereof will be omitted.

Base station 500 illustrated in FIG. 13 notifies a terminal of a communication target (terminal 600 illustrated in FIG. 14, which will be described later) of information related to the SR resource and information related to a resource (hereinafter, referred to as "SPS-ACK/NACK resource") for the response signal to downlink data (downlink data whose assignment resource is notified in advance and downlink assignment control information is not necessarily arranged in the same sub frame, hereinafter referred to as "SPS data") assigned by the Semi-Persistent Scheduling (SPS) in advance.

Further, base station 500 sets (configures) in advance for each terminal 600 whether or not terminal 600 of the communication target (FIG. 14) needs to apply the SCTD (SORTD) to uplink control information (that is, the SR and the response signal). Further, base station 500 notifies terminal 600, which is set to apply the SCTD, of information related to a resource (common resource) commonly used at the time of transmission of the SR and at the time of transmission of the response signal at the same time as the setting.

Control section 501 of base station 500 decides whether or not downlink data is to be transmitted to terminal 600 together with control information. That is, when downlink data to be transmitted to terminal 600 is "SPS data", since the data is assigned to a downlink resource previously notified to terminal 600, control section 501 decides that downlink assignment control information needs not to be transmitted together. Meanwhile, when downlink data to be transmitted to terminal 600 is not SPS data and resource assignment information needs to be notified to terminal 600, control section 501 decides that the downlink assignment control information is to be transmitted together. In addition, when the downlink assignment control information is transmitted to terminal 600 together with downlink data, similarly to Embodiment 1, control section 501 decides a downlink resource (that is, a downlink control information assignment resource) for transmitting the downlink assignment control information, and a downlink resource included in the control information (that is, a downlink data assignment resource) for transmitting downlink data.

Further, when the downlink assignment control information is transmitted to terminal 600 together with downlink data, similarly to Embodiment 1, control section 501 decides a coding rate used when control information is transmitted to terminal 600.

Further, when the downlink assignment control information is transmitted to terminal 600 together with downlink data, similarly to Embodiment 1, control section 501 outputs the information related to the downlink data assignment resource to control information generating section 102, and outputs the information related to the coding rate used when the control information is transmitted, to coding section 103.

Further, control section 501 outputs a coding rate of transmission data (that is, downlink data) to coding section 105. At this time, as to SPS data, control section 501 outputs the coding rate previously notified to terminal 600 to coding section 105. However, as to downlink data other than SPS data, control section 501 decides a coding rate optimum at the time of transmission and outputs the decided coding rate to coding section 105.

Further, control section 501 outputs the information related to the downlink data assignment resource and the information related to the downlink control information assignment resource to mapping section 108. At this time, as to SPS data, control section 510 outputs the information related to the downlink data assignment resource previously notified to terminal 600, to mapping section 108. Meanwhile, as to downlink data other than the SPS data, control section 501 outputs the information related to the downlink control information assignment resource and the information related to the downlink data assignment resource represented by the downlink assignment control information, to mapping section 108.

Sequence control section 516 generates ZAC sequences which respectively correspond to data portions and reference signal portions of the SR resource, the ACK/NACK resource (that is, the resource for the response signal to downlink data other than the SPS data), an SPS-ACK/NACK resource, and the common resource, which are transmitted from terminal 600. Sequence control section 516 specifies a correlation window for extracting a signal in association with the resources, similarly to Embodiment 1. Sequence control section 516 outputs information representing the specified correlation window and the generated ZAC sequence to correlation processing section 117.

Figure 14:
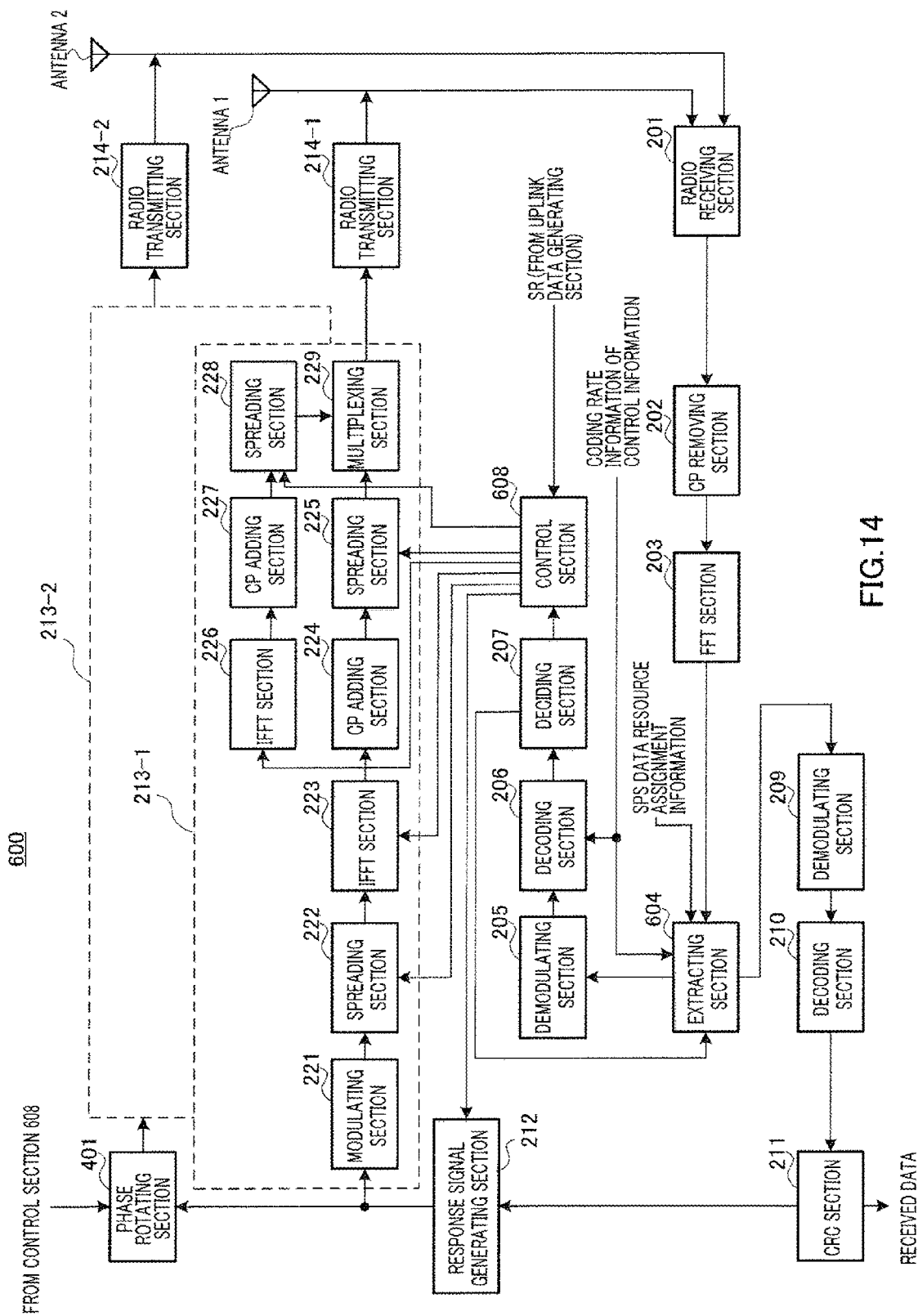
FIG. 14 is a block diagram illustrating a configuration of a terminal according to Embodiment 3 of the present invention.

Next, FIG. 14 illustrates a configuration of terminal 600 according to the present embodiment. In FIG. 14, the same components as in terminal 400 of FIG. 10 (Embodiment 2) are denoted by the same reference numerals, and thus a description thereof will be omitted.

In terminal 600 illustrated in FIG. 14, when data other than SPS data is received, similarly to Embodiment 1, extracting section 604 extracts the downlink control channel signal (PDCCH signal) from the received signal received from FFT section 203 according to input coding rate information. That is, since the number of CCEs configuring the downlink control information assignment resource changes according to the coding rate, extraction section 604 extracts a downlink control channel signal using a number of CCEs corresponding to the coding rate as an extraction unit. The extracted downlink control channel signal is outputted to demodulating section 205.

Further, when data other than SPS data is received, similarly to Embodiment 1, extraction section 604 extracts downlink data (the downlink data channel signal (the PDSCH signal)) from the received signal, based on the information related to the downlink data assignment resource, which is addressed to its own terminal, received from deciding section 207, and outputs the extracted downlink data to demodulating section 209.

On the contrary, when SPS data is received, extracting section 604 extracts the SPS data (a PDSCH signal corresponding to the SPS data) from the received signal, based on input SPS data resource assignment information, and outputs the extracted SPS data to demodulating section 209.

When the SR has been received from the uplink data generating section (not illustrated), similarly to Embodiment 2, control section 608 outputs information (the ZAC sequence, the cyclic shift index, the frequency resource information, the Walsh sequence, and the DFT sequence) corresponding to the SR resource to uplink control channel signal generating section 213-1, and outputs an instruction signal to phase rotating section 401 to rotate a phase of a signal by a previously set angle (for example, 90°) (to multiply a signal by $\exp(j\pi/2)$). Meanwhile, when the SR has not been received from the uplink data generating section (not illustrated) and a response signal to be transmitted is a response signal to data other than SPS data, control section 608 outputs information (the ZAC sequence, the cyclic shift index, the frequency resource information, the Walsh sequence, and the DFT sequence) corresponding to the ACK/NACK resource to uplink control channel signal generating section 213-1, and outputs an instruction signal to phase rotating section 401 not to rotate a phase of a signal. Further, when the SR has not been received from the uplink data generating section and a response signal to be transmitted is a response signal to SPS data, control section 608 outputs information (the ZAC sequence, the cyclic shift index, the frequency resource information, the Walsh sequence, and the DFT sequence) corresponding to the SPS-ACK/NACK resource to uplink control channel signal generating section 213-1, and outputs an instruction signal to phase rotating section 401 not to rotate a phase of a signal.

Further, when SPS data is transmitted from base station 500, terminal 600 receives the SPS data in a previously notified sub frame and performs the blind decision on the downlink assignment control information in sub frames other than the previously notified sub frame. When the downlink assignment control signal addressed to its own terminal is detected, terminal 600 receives downlink data other than the SPS data.

Next, an operation of terminal 600 (FIG. 14) will be described. Terminal 600 performs uplink signal transmission control based on an "operation 1" which will be described later when downlink data other than SPS data is received, and performs uplink signal transmission control based on an "operation 2" which will be described later when SPS data is received.

<When Terminal 600 Receives Downlink Data Other than SPS Data: Operation 1>

A detailed operation of the transmission control process in terminal 600 according to the generation status of the SR and the generation status of the response signal when terminal 600 receives downlink data other than SPS data is the same as in Embodiment 2.

<When Terminal 600 Receives SPS Data: Operation 2>

Figure 15A:
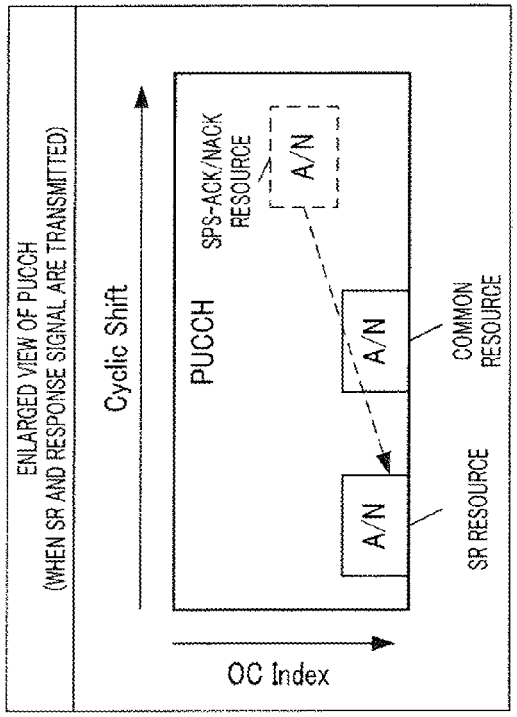
FIGS. 15A to 15D each illustrates an operation of a terminal according to Embodiment 3 of the present invention.

In the following description, base station 500 notifies terminal 600 of one information related to the SR resource, one information related to the SPS-ACK/NACK resource, and one information related to the common resource in advance, in the uplink unit band illustrated in FIG. 2 (the uplink unit band set to terminal 600), as illustrated in FIG. 15A. That is, control section 608 of terminal 600 retains the information related to the SR resource, the information related to the SPS-ACK/NACK resource, and the information related to the common resource, all of which are notified from base station 500.

In FIG. 15A, the SR resource, the ACK/NACK resource (not illustrated), the SPS-ACK/NACK resource, and the common resource are different code resources which differ in at least one of the ZAC sequence (primary spreading) and the OC index.

Hereinafter, with reference to FIG. 16, a description will be made below in connection with a detailed operation of the transmission control process in terminal 600 according to the generation status of the SR and the generation status of the response signal in a certain sub frame, when terminal 600 receives SPS data in the PUCCH of the uplink unit band illustrated in FIG. 15A (operation 2), similarly to Embodiment 2.

In the following description, similarly to Embodiment 2, it is assumed that an angle previously set to phase rotating section 301 and an angle previously set to phase rotating section 401 are −90° and 90°, respectively. That is, values multiplied to the signal, which are previously set to phase rotating section 301 and phase rotating section 401, are $\exp(-j\pi/2)$ and $\exp(j\pi/2)$, respectively. Further, as a constellation point arrangement (constellation) of response signals generated by response signal generating section 212, ACK is associated with a constellation point (−1,0), and NACK is associated with a constellation point (1,0).

<When SR and Response Signal to SPS Data have been Simultaneously Generated in Terminal 600>

Figure 15B:
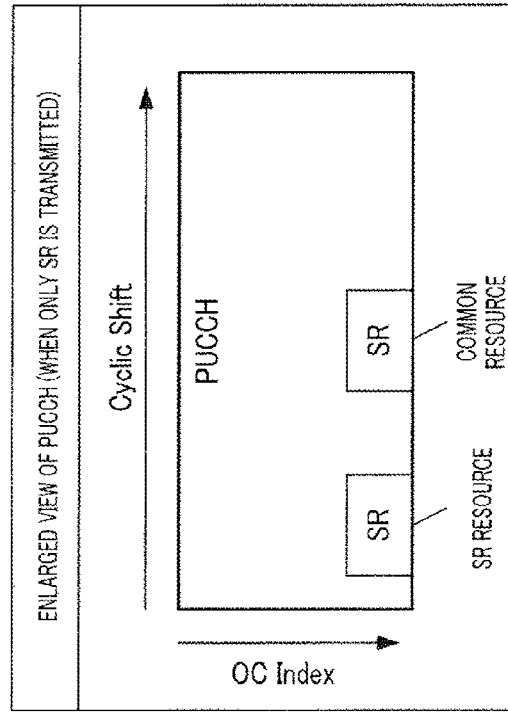

In this case, terminal 600 transmits a response signal (which is denoted as "A/N" in FIGS. 15A to 15D and FIG. 16) to SPS data using the SR resource and the common resource, as illustrated in FIG. 15B. Specifically, control section 608 of terminal 600 performs control such that the same response signal is transmitted through antenna 1 using the SR resource and through antenna 2 using the common resource.

Further, control section 608 instructs response signal generating section 212 to output the response signal (the response signal to the SPS data) input from CRC section 211 to modulating section 221 of uplink control signal generating sections 213-1 and phase rotating section 401.

Further, control section 608 outputs an instruction signal to phase rotating section 401 to rotate the phase of the response signal input from response signal generating section 212 by 90° (to multiply the response signal by $\exp(j\pi/2)$).

Then, phase rotating section 401 rotates the phase of the response signal input from response signal generating section 212 by 90° (that is, multiplies the response signal by $\exp(j\pi/2)$).

Figure 16:
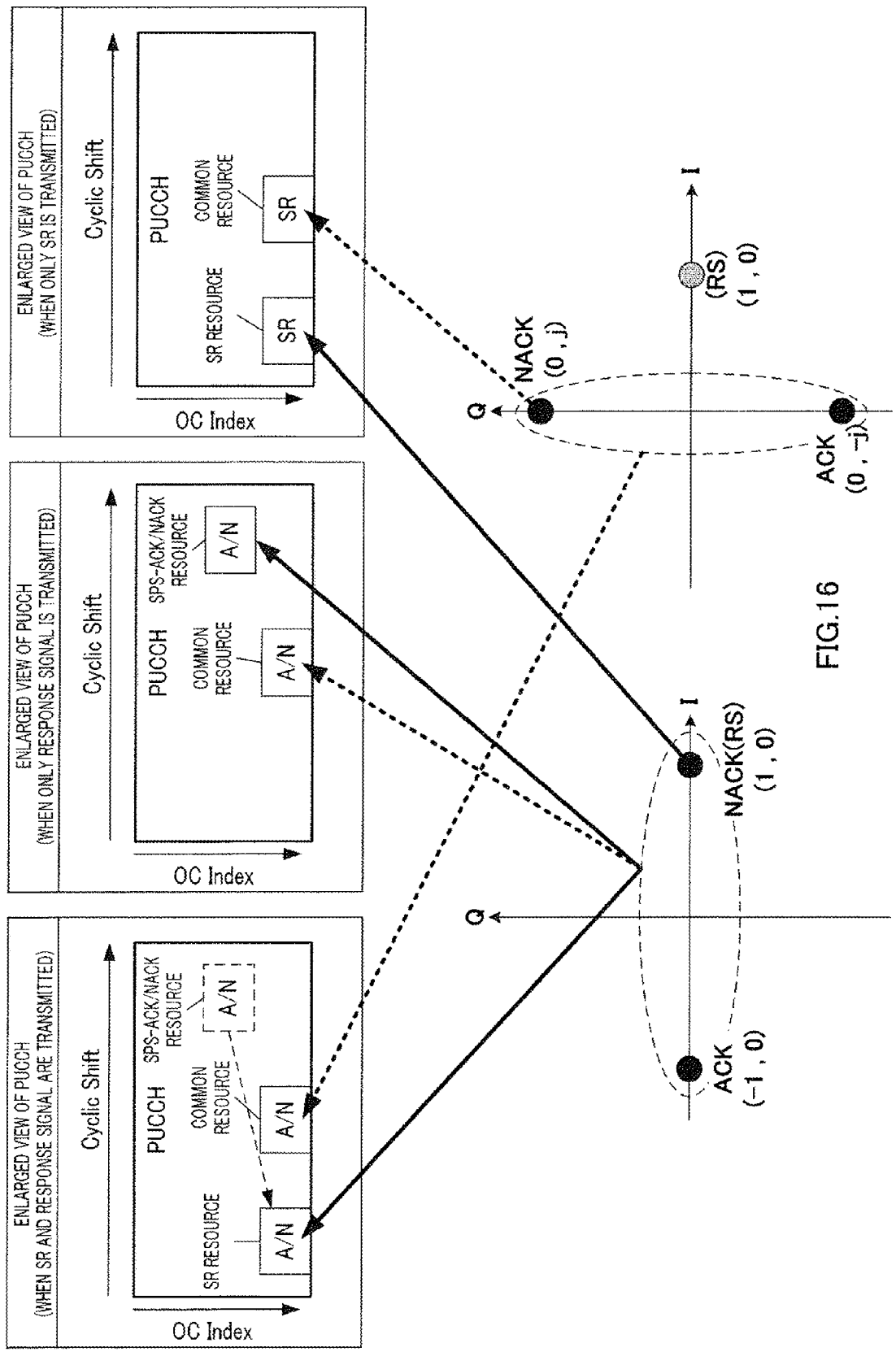
FIG. 16 illustrates an operation of a terminal according to Embodiment 3 of the present invention.

That is, when the SR and the response signal to the SPS data have been simultaneously generated in a certain sub frame ("when SR and response signal are transmitted" illustrated in FIG. 16), in the SR resource, as a constellation point arrangement of the response signal ("A/N"), ACK is associated with the constellation point (−1,0), and NACK is associated with the constellation point (1,0). On the other hand, in the common resource, as a constellation point arrangement of the response signal ("A/N"), ACK is associated with the constellation point (0,−j), and NACK is associated with the constellation point (0,j) as illustrated in FIG. 16. That is, when the SR and the response signal to the SPS data have been simultaneously generated in a certain sub frame, similarly to Embodiment 2, there is a difference of 90° between the constellation of the response signal assigned to the SR resource and the constellation of the response signal assigned to the common resource.

<When Only Response Signal to SPS Data has been Generated in Terminal 600>

Figure 15C:
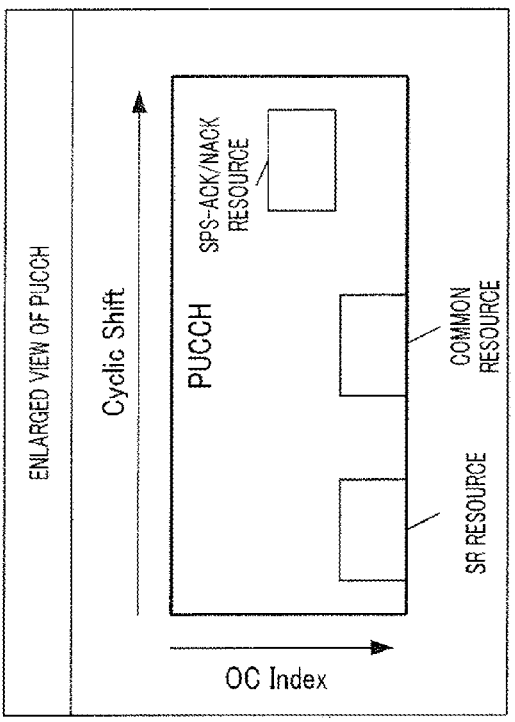

In this case, terminal 600 transmits a response signal ("A/N") to downlink data using the ACK/NACK resource and the common resource, as illustrated in FIG. 15C. Specifically, control section 608 of terminal 600 performs control such that the same response signal is transmitted through antenna 1 using the ACK/NACK resource and through antenna 2 using the common resource.

Further, control section 608 instructs response signal generating section 212 to output the response signal (the response signal to the SPS data) input from CRC section 211 to modulating section 221 of uplink control signal generating sections 213-1 and phase rotating section 401.

Further, control section 608 outputs an instruction signal to phase rotating section 401 not to rotate the phase of the response signal input from response signal generating section 212 (not to multiply the response signal by $\exp(j\pi/2)$).

That is, when only the response signal has been generated in a certain sub frame ("when only response signal is transmitted" illustrated in FIG. 16), in the SPS-ACK/NACK resource and the SR resource, as a constellation point arrangement of the response signal ("A/N"), ACK is associated with the constellation point (−1,0), and NACK is associated with the constellation point (1,0). That is, when only the response signal to the SPS data has been generated in a certain sub frame, similarly to Embodiment 2, the constellation of the response signal assigned to the ACK/NACK resource is identical to the constellation of the response signal assigned to the common resource.

<When Only SR has been Generated in Terminal 600>

Figure 15D:
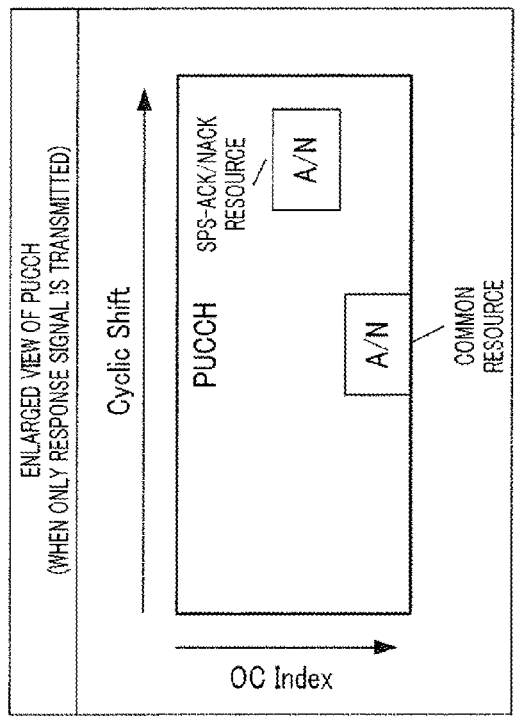

In this case, terminal 600 transmits the SR using the same constellation point as "NACK" using the SR resource and the common resource, as illustrated in FIG. 15D. Specifically, control section 608 of terminal 600 perform control such that the same SR (NACK) is transmitted through antenna 1 using the SR resource and transmitted through antenna 2 using the common resource.

That is, control section 608 instructs response signal generating section 212 to output "NACK" to modulating section 221 of uplink control signal generating sections 213-1 and phase rotating section 401.

Further, control section 608 outputs an instruction signal to phase rotating section 401 to rotate the phase of the signal (NACK) input from response signal generating section 212 by 90° (to multiply the signal (NACK) by $\exp(j\pi/2)$).

That is, when only the SR has been generated in a certain sub frame ("when only SR is transmitted" illustrated in FIG. 16), in the SR resource, the signal (NACK) is associated with the constellation point (1,0). On the other hand, in the common resource, the signal (NACK) is associated with the constellation point (0,j), as illustrated in FIG. 16. That is, when only the SR has been generated in a certain sub frame, similarly to Embodiment 2, there is a difference of 90° between the constellation of the SR (NACK) assigned to the SR resource and the constellation of the SR (NACK) assigned to the common resource.

<When Neither SR Nor Response Signal to SPS Data have Been Generated in Terminal 600 (Not Illustrated)>

In this case, terminal 600 does not transmit the SR and the response signal in the PUCCH resource.

Hereinbefore, the detailed operation of the transmission control process in terminal 600, according to the generation status of the SR and the generation status of the response signal to the SPS data, has been described.

As described above, similarly to Embodiment 2, terminal 600 changes the phase rotation amount of the signal (the SR or the response signal to the SPS data) assigned to the common resource according to whether or not the SR has been generated, regardless of whether or not the response signal to the SPS data has been generated in the same sub frame.

That is, terminal 600 sets a phase difference between constellation points at which signals having the same content (ACK or NACK) are arranged in the SR resource and the common resource when the SR and the response signal to the SPS data have been simultaneously generated in a certain sub frame and when only the SR has been generated in a certain sub frame to be difference from a phase difference between constellation points at which signals having the same content (ACK or NACK) are arranged in the ACK/NACK resource and the common resource when only the response signal to the SPS data has been generated in a certain sub frame.

Thus, in base station 500, similarly to Embodiment 2, a phase difference corresponding to the phase rotation amount occurs between a combining result obtained by the MRC in the set of the wrong resources, of the set of the SR resource and the common resource and the set of the ACK/NACK resource and the common resource, and the constellation point of the response signal. That is, in base station 500, there is a high possibility that the combining result of the set of the wrong resources (that is, the set of resources not used by terminal 600), of the set of the SR resource and the common resource and the set of the ACK/NACK resource and the common resource, is significantly away from the constellation point of the response signal.

That is, in base station 500, there is a high possibility that the likelihood calculated based on the set of the wrong resources will be significantly lower than the likelihood calculated based on the set of the correct resources. That is, similarly to Embodiment 2, base station 500 can significantly change the difference between the likelihood of the set of the correct resources and the likelihood of the set of the wrong resources. Thus, it is possible to improve the decision accuracy of deciding which of the set of the SR resource and the common resource and the set of the ACK/NACK resource and the common resource has been used by terminal 600.

Thus, according to the present embodiment, similarly to Embodiment 2, even when the terminal receives the SPS data, it is possible to suppress an increase in the overhead of the uplink control channel (PUCCH), and further it is possible to improve the decision accuracy of, at the base station, the resource used by the terminal.

The present embodiment has been described in connection with the example in which base station 500 does not transmit the downlink assignment control information to terminal 600 when transmitting the SPS data. However, base station 500 may transmit the downlink assignment control information together even with the SPS data as necessary. That is, when the SPS data is transmitted using a resource (or a parameter) other than a certain downlink resource (or another parameter (modulation and coding scheme (MCS) or the like)) previously notified to terminal 600 for a certain reason, base station 500 transmits the downlink assignment control information together with the SPS data. In this case, since the terminal can receive the downlink assignment control information, terminal 600 specifies the ACK/NACK resource corresponding to the CCE occupied by the downlink assignment control information as the resource for the response signal corresponding to the SPS data.

Hereinbefore, the embodiments of the present invention have been described.

The above embodiments have been described in connection with the example in which the terminal consistently transmits the uplink control signal through the SCTD (SORTD). However, the base station may set (configure) the terminal to perform SCTD transmission as necessary, and notify the terminal of information related to the common resource at the same time when the SCTD is set. In this case, the terminal transmits the uplink control signal using the same technique as the typical LTE (that is, using any one of the SR resource, the SPS-ACK/NACK resource, and the ACK/NACK resource) unless SCTD transmission is not instructed. Meanwhile, after the base station sets the SCTD to the terminal, the terminal performs signal transmission control by the SCTD using any one of the SR resource, the SPS-ACK/NACK resource and the ACK/NACK resource, and the common resource separately notified from the base station (that is, a total of two resources).

Further, the above embodiment have been described in connection with the example in which the ZAC sequence is used for primary spreading in the PUCCH resource, and the Walsh sequence and the DFT sequence are used as the OC index for secondary spreading. However, in the present invention, non-ZAC sequences which are mutually separable by different cyclic shift indices may be used for primary-spreading. For example, a generalized chirp like (GCL) sequence, a constant amplitude zero auto correlation (CAZAC) sequence, a Zadoff-Chu (ZC) sequence, a pseudo-noise (PN) sequence such as an M sequence or an orthogonal gold code sequence, a sequence which is randomly generated by a computer and has a steep auto-correlation characteristic on the time axis, or the like may be used for primary-spreading. Further, if sequences are orthogonal to each other or sequences are recognized as being substantially orthogonal to each other, any sequences may be used as OC indices for secondary-spreading. In the above descriptions, resources (e.g. PUCCH resources) of response signals are defined by a cyclic shift index of a ZAC sequence and a sequence number of an orthogonal cover index.

Further, the above embodiments have been described in connection with the example in which the resource used when the terminal transmits only the response signal is different from the resource used when the terminal simultaneously transmits the SR and the response signal. However, the present invention is not limited to the example in which the terminal transmits the SR and the response signal. For example, the present invention can be applied, even when so-called channel selection in which a terminal selects two ACK/NACK resources among a plurality of ACK/NACK resources and transmits a response signal is used. For example, on the basis of two ACK/NACK resources selected from among a plurality of ACK/NACK resources, the terminal may perform control as to whether to rotate (to multiply by $\exp(j\pi/2)$) a phase of a signal transmitted through any one of selected two ACK/NACK resources.

Figure 17:
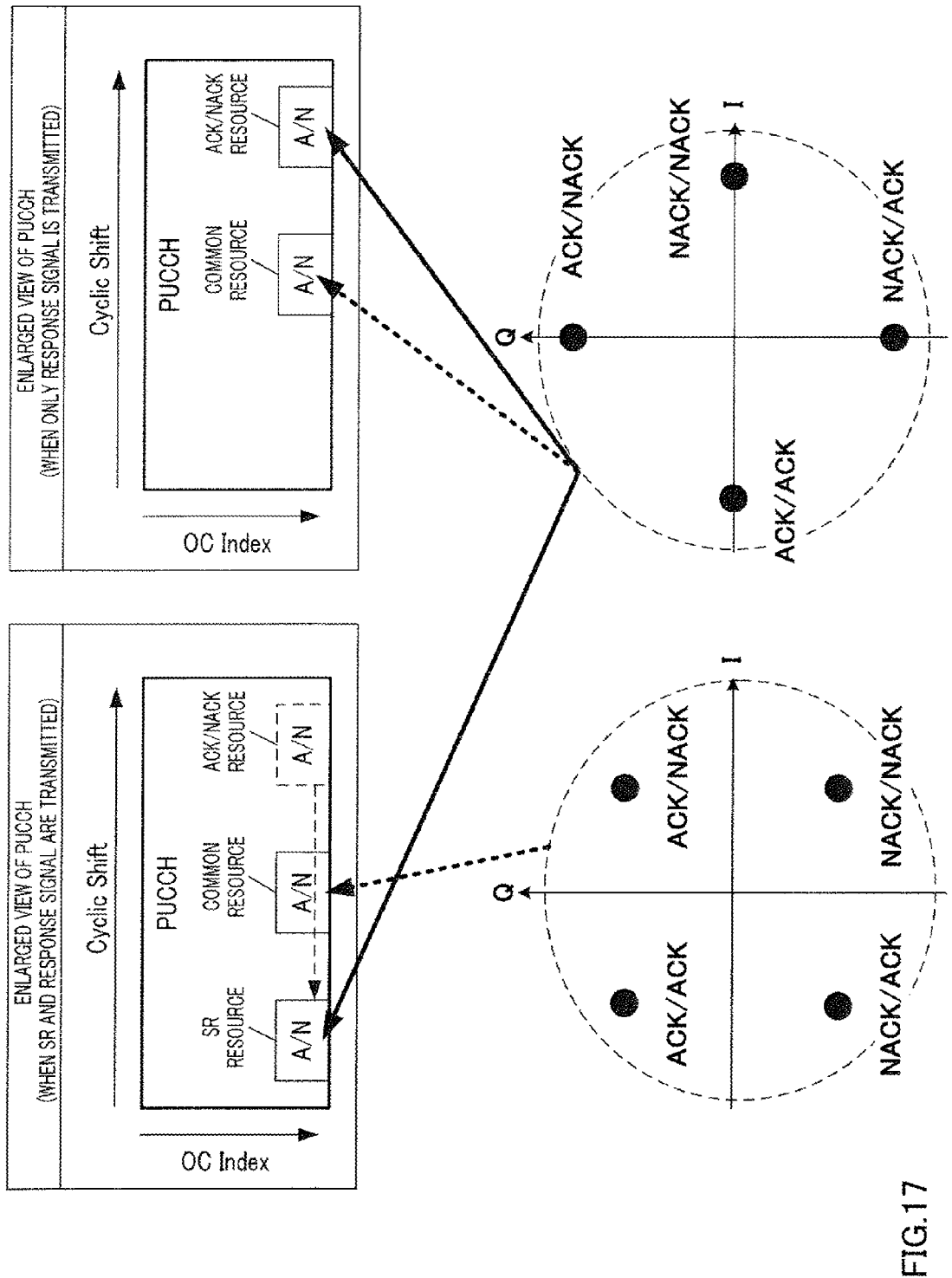
FIG. 17 illustrates a modification of Embodiment 2 of the present invention.

Further, the above embodiments have been described in connection with the example in which the response signal transmitted by the terminal is modulated by the BPSK scheme. However, the present invention is not limited to the BPSK scheme and can be applied even when modulation is performed, for example, by a quadrature phase shift keying (QPSK) scheme. For example, when the SR and the response signal have been simultaneously generated in a certain sub frame, by rotating the phase of the response signal assigned to the common resource by 45° (by multiplying the response signal by $\exp(j\pi/4)$) as illustrated in FIG. 17, the same effect as in the above embodiments can be obtained in the terminal.

Further, the above embodiments have been described as an antenna, but the present invention may be similarly applied to an antenna port.

The antenna port refers to a logical antenna configured with one or more physical antennas. That is, the antenna port is not necessarily limited to referring to one physical antenna but may refer to an array antenna configured with a plurality of antennas.

For example, in the 3GPP-LTE, the number of physical antennas configuring the antenna port is not defined, and the antenna port is defined as a minimum unit in which the base station can transmit different reference signals.

Further, the antenna port may be defined as a minimum unit capable of multiplying weighting of a precoding vector.

Further, in the above embodiments, hardware implementation of the present invention has been described as an example; however, the present invention may be implemented by software.

The functional blocks used for description of the above embodiments are typically implemented as large scale integration (LSI) which is an integrated circuit (IC). Such blocks may be individual chips, or contained on a single chip partially or totally. "LSI" is adopted here but this may also be referred to as "IC," "system LSI," "super LSI" or "ultra LSI" depending on differing extents of integration.

A circuit integration technique is not limited to the LSI, and it may be implemented by a dedicated circuit or a universal processor. After LSI manufacture, utilization of an FPGA (Field Programmable Gate Array) or a reconfigurable processor where connections and settings of circuit cells within an LSI can be reconfigured is also possible.

Further, when a circuit integration technique of replacing the LSI by another technique that is advanced or derived from a semiconductor technology appears, the functional blocks may be integrated using the technique. There may be a possibility that a bio technology will be applied.

The disclosure of Japanese Patent Application Nos. 2009-188760, filed on Aug. 17, 2009 and 2010-026943, filed on Feb. 9, 2010, including the specification, drawings and abstract, is incorporated herein by reference in its entirety.

INDUSTRIAL APPLICABILITY

The present invention can be applied to a mobile communication system or the like.

REFERENCE SIGNS LIST

100, 300, 500 Base station
200, 400, 600 Terminal
101, 208, 408, 501, 608 Control Section
102 Control information generating section
103, 105 Coding section
104, 107, 221 Modulating section
106 Data transmission control section
108 Mapping section
109, 223, 226 IFFT section
110, 224, 227 CP adding section
111, 214 Radio transmitting section
112, 201 Radio receiving section
113, 202 CP removing section
114 PUCCH extracting section
115 Despreading section
116, 516 Sequence control section
117 Correlation processing section
118, 207, 318 Deciding section
119 Retransmission control signal generating section
203 FFT section 204, 604 Extracting section
205, 209 Demodulating section
206, 210 Decoding section
211 CRC section
212 Response signal generating section
213 Uplink control channel signal generating section
222, 225, 228 Spreading section
229 Multiplexing section
301, 401 Phase rotating section

The invention claimed is:

1. A terminal apparatus that assigns either a response signal based on an error detection result of downlink data or an uplink control signal representing generation of uplink data to different code resources, and transmits the response signal or the uplink control signal assigned to the different code resources through a plurality of antennas, comprising:
   a receiving section that receives the downlink data assigned to a downlink data channel;
   a generating section that generates the response signal based on the error detection result of the downlink data;
   a transmitting section that transmits the response signal or the uplink control signal using the different code resources; and
   a control section that controls transmission of the response signal or the uplink control signal, based on a generation status of the response signal or the uplink control signal,
   wherein the control section transmits, through a first antenna among the plurality of antennas, the uplink control signal or the response signal using either one of a first code resource and a second code resource, and transmits, through a second antenna among the plurality of antennas, the uplink control signal or the response signal consistently using a third code resource, the first code resource being a code resource to which the response signal is assigned when the uplink control signal and the response signal have been simultaneously generated within a transmission unit time and to which the uplink control signal is assigned when only the uplink control signal has been generated within the transmission unit time, the second code resource being a code resource to which the response signal is assigned when only the response signal has been generated within the transmission unit time, the third code resource being a code resource to which the response signal is assigned when the uplink control signal and the response signal have been simultaneously generated within the transmission unit time or when only the response signal has been generated within the transmission unit time and to which the uplink control signal is assigned when only the uplink control signal has been generated within the transmission unit time, and the first code resource, the second code resource and the third code resource being different code resources.

2. A terminal apparatus that assigns either a response signal based on an error detection result of downlink data or an uplink control signal representing generation of uplink data to different code resources, and transmits the response signal or the uplink control signal assigned to the different code resources through a plurality of antennas, comprising:
a receiving section that receives the downlink data assigned to a downlink data channel;
a generating section that generates the response signal based on the error detection result of the downlink data;
a transmitting section that transmits the response signal or the uplink control signal using the different code resources; and
a control section that controls transmission of the response signal or the uplink control signal, based on a generation status of the response signal or the uplink control signal,
wherein the control section transmits the uplink control signal or the response signal using either one of a first code resource to which the response signal is assigned when the uplink control signal and the response signal have been simultaneously generated within a transmission unit time and to which the uplink control signal is assigned when only the uplink control signal has been generated within the transmission unit time and a second code resource to which the response signal is assigned when only the response signal has been generated within the transmission unit time, and using a third code resource to which the response signal is assigned when the uplink control signal and the response signal have been simultaneously generated within the transmission unit time or when only the response signal has been generated within the transmission unit time and to which the uplink control signal is assigned when only the uplink control signal has been generated within the transmission unit time, among the first code resource, the second code resource, and the third code resource which are different code resources,
wherein the control section sets a first phase difference between constellation points at which signal having the same content are arranged in the first code resource and the third code resource when the uplink control signal and the response signal have been simultaneously generated within the transmission unit time or when only the uplink control signal has been generated within the transmission unit time, to be different from a second phase difference between constellation points at which signal having the same content are arranged in the second code resource and the third code resource when only the response signal has been generated within the transmission unit time.

3. The terminal apparatus according to claim 2, wherein the control section sets the first phase difference to be different from the second phase difference so as to maximize a difference between the first phase difference and the second phase difference.

4. The terminal apparatus according to claim 2, wherein the control section sets a constellation of a signal assigned to the first code resource to be different from a constellation of a signal assigned to the third code resource when the uplink control signal and the response signal have been simultaneously generated within the transmission unit time or when only the uplink control signal has been generated within the transmission unit time, and sets a constellation of a signal assigned to the second code resource to be identical to the constellation of the signal assigned to the third code resource when only the response signal has been generated within the transmission unit time.

5. The terminal apparatus according to claim 4, wherein the control section rotates the constellation of the signal assigned to the third code resource with respect to the constellation of the signal assigned to the first code resource by 90 degrees when the uplink control signal and the response signal have been simultaneously generated within the transmission unit time or when only the uplink control signal has been generated within the transmission unit time.

6. The terminal apparatus according to claim 4, wherein the control section multiplies the signal assigned to the third code resource by $\exp(j\pi/2)$ when the uplink control signal and the response signal have been simultaneously generated within the transmission unit time or when only the uplink control signal has been generated within the transmission unit time.

7. A signal transmission control method in a terminal apparatus that assigns either a response signal based on an error detection result of downlink data or an uplink control signal representing generation of uplink data to different code resources, and transmits the response signal or the uplink control signal assigned to the different code resources through a plurality of antennas, comprising:
receiving the downlink data assigned to a downlink data channel;
generating the response signal based on the error detection result of the downlink data;
transmitting the response signal or the uplink control signal using the different code resources; and
controlling transmission of the response signal or the uplink control signal based on a generation status of the response signal or the uplink control signal,
wherein in controlling the transmission of the response signal or the uplink control signal, the uplink control signal or the response signal is transmitted, through a first antenna among the plurality of antennas, using either one of a first code resource and a second code resource, and the uplink control signal or the response signal is transmitted, through a second antenna among the plurality of antennas, consistently using a third code resources, the first code resource being a code resource to which the response signal is assigned when the uplink control signal and the response signal have been simultaneously generated within a transmission unit time and to which the uplink control signal is assigned when only the uplink control signal has been generated within the transmission unit time, the second code resource being a code resource to which the response signal is assigned when only the response signal has been generated within the transmission unit time, the third code resource being a code resource to which the response signal is assigned when the uplink control signal and the response signal have been simultaneously generated within the transmission unit time and when only the response signal has been generated within the transmission unit time and to which the uplink control signal is assigned when only the uplink control signal has been generated within the transmission unit time, and the first code resource, the second code resource, and the third code resource being different code resources.

* * * * *